United States Patent
Abe et al.

(10) Patent No.: US 11,405,277 B2
(45) Date of Patent: Aug. 2, 2022

(54) INFORMATION PROCESSING DEVICE, INFORMATION PROCESSING SYSTEM, AND NETWORK COMMUNICATION CONFIRMATION METHOD

(71) Applicant: FUJITSU LIMITED, Kawasaki (JP)

(72) Inventors: Kazumi Abe, Kawasaki (JP); Munenori Maeda, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 17/110,360

(22) Filed: Dec. 3, 2020

(65) Prior Publication Data

US 2021/0234757 A1 Jul. 29, 2021

(30) Foreign Application Priority Data

Jan. 27, 2020 (JP) .............................. JP2020-010918

(51) Int. Cl.
*G06F 15/173* (2006.01)
*H04L 41/0866* (2022.01)
*H04L 67/1001* (2022.01)

(52) U.S. Cl.
CPC ...... *H04L 41/0866* (2013.01); *H04L 67/1001* (2022.05)

(58) Field of Classification Search
CPC ............. H04L 41/0866; H04L 67/1002; H04L 49/354; H04L 49/351; H04L 12/46
See application file for complete search history.

(56) References Cited

U.S. PATENT DOCUMENTS

| 6,091,737 | A  | * | 7/2000  | Hong ..................... | H04L 49/351 370/431 |
| 6,907,036 | B1 | * | 6/2005  | Malalur ................. | H04L 12/46 370/382 |
| 8,037,172 | B2 | * | 10/2011 | Tanikawa ............ | H04L 43/0817 709/224 |
| 8,332,506 | B2 | * | 12/2012 | Sayama .............. | G06F 11/0709 709/224 |
| 2003/0108018 | A1 | * | 6/2003 | Dujardin ............. | H04L 67/1029 370/338 |
| 2003/0195984 | A1 | * | 10/2003 | Zisapel ............. | H04L 29/12066 709/238 |
| 2004/0049714 | A1 | * | 3/2004 | Marples ................. | H04L 43/00 714/43 |
| 2006/0031446 | A1 | * | 2/2006 | Hamedi .............. | H04L 41/0213 709/223 |
| 2006/0101026 | A1 | * | 5/2006 | Fukushima ......... | H04L 61/2076 |

(Continued)

FOREIGN PATENT DOCUMENTS

| JP | 2014-154925 A | 8/2014 |
| JP | 2016-201760 A | 12/2016 |
| JP | 2018-110345 A | 7/2018 |

*Primary Examiner* — Razu A Miah
(74) *Attorney, Agent, or Firm* — Fujitsu Patent Center

(57) ABSTRACT

An information processing device, includes a memory; and a processor coupled to the memory and configured to: store, in the memory, a confirmation program for performing communication confirmation of a network, transmit the confirmation program to a server in the network, collect an execution result of the communication confirmation transmitted from the server by causing the server to execute the communication confirmation, and perform correctness determination of the execution result.

14 Claims, 27 Drawing Sheets

(56) References Cited

U.S. PATENT DOCUMENTS

| | | | |
|---|---|---|---|
| 2006/0168220 A1* | 7/2006 | Katoh | H04L 63/08 709/225 |
| 2006/0212554 A1* | 9/2006 | Shouno | H04L 61/2575 709/221 |
| 2008/0294739 A1* | 11/2008 | Tanikawa | H04L 43/0817 709/206 |
| 2010/0082777 A1* | 4/2010 | Montgomery | H04L 41/085 709/220 |
| 2011/0078303 A1* | 3/2011 | Li | H04L 67/1008 709/224 |
| 2012/0017210 A1* | 1/2012 | Huggins | G06F 9/5055 718/1 |
| 2012/0324536 A1* | 12/2012 | McDysan | H04L 12/4641 726/3 |
| 2013/0145221 A1* | 6/2013 | Kaneko | G06F 11/3055 714/48 |
| 2014/0181248 A1* | 6/2014 | Deutsch | H04L 49/354 709/217 |
| 2014/0196134 A1* | 7/2014 | Yamaguchi | G06F 21/44 726/7 |
| 2014/0253947 A1* | 9/2014 | Akutsu | H04N 1/00973 358/1.14 |
| 2014/0254395 A1* | 9/2014 | Pugaczewski | H04L 43/50 370/250 |
| 2015/0113172 A1* | 4/2015 | Johnson | H04L 67/125 709/245 |
| 2015/0242236 A1* | 8/2015 | Nakazono | G06F 11/3055 718/1 |
| 2016/0087933 A1* | 3/2016 | Johnson | H04L 67/34 709/245 |
| 2017/0034012 A1* | 2/2017 | Douglas | H04L 41/50 |
| 2018/0255124 A1* | 9/2018 | Blumenau | H04L 61/1511 |
| 2019/0075011 A1* | 3/2019 | Hankins | H04L 12/4633 |
| 2019/0196844 A1 | 6/2019 | Hirai | |

* cited by examiner

FIG. 17 p0: MANAGEMENT LAN PORT
p1: BUSINESS LAN PORT
p2: BUSINESS LAN PORT
p3: vMotion LAN PORT
p4: storage LAN PORT

FIG. 18

| | | | SERVER sv1 (FIRST SERVER) | | | | | | | | | | | | | | | | SERVER sv2 (FIRST SERVER) |
|---|---|---|---|---|---|---|---|---|---|---|---|---|---|---|---|---|---|---|---|---|
| | | | SLOT st1 | | | | | | | | SLOT st2 | | | | | | | | | |
| | | PORT P0 | | | | PORT P1 | | | | PORT P0 | | | | PORT P1 | | | | | | |
| mgmt | 192.168.8.1 | ⇅ | 192.168.8.2 | mgmt | | | | | | | | | | | | | | | | |
| service | 192.168.48.1 | ⇅ | 192.168.48.2 | service | | | | | | | | | | | | | | | | |
| service | 192.168.56.1 | ⇅ | 192.168.56.2 | service | | | | | | | | | | | | | | | | |
| migrate | 192.168.16.1 | ⇅ | 192.168.16.2 | migrate | | | | | | | | | | | | | | | | |
| storage | 192.168.24.1 | ⇅ | 192.168.24.2 | storage | | | | | | | | | | | | | | | | |
| mgmt | 192.168.9.1 | ⇅ | 192.168.9.2 | mgmt | | | | | | | | | | | | | | | | |
| service | 192.168.49.1 | ⇅ | 192.168.49.2 | service | | | | | | | | | | | | | | | | |
| service | 192.168.57.1 | ⇅ | 192.168.57.2 | service | | | | | | | | | | | | | | | | |
| migrate | 192.168.17.1 | ⇅ | 192.168.17.2 | migrate | | | | | | | | | | | | | | | | |
| storage | 192.168.25.1 | ⇅ | 192.168.25.2 | storage | | | | | | | | | | | | | | | | |
| mgmt | 192.168.10.1 | ⇅ | 192.168.10.2 | mgmt | | | | | | | | | | | | | | | | |
| service | 192.168.50.1 | ⇅ | 192.168.50.2 | service | | | | | | | | | | | | | | | | |
| service | 192.168.58.1 | ⇅ | 192.168.58.2 | service | | | | | | | | | | | | | | | | |
| migrate | 192.168.18.1 | ⇅ | 192.168.18.2 | migrate | | | | | | | | | | | | | | | | |
| storage | 192.168.26.1 | ⇅ | 192.168.26.2 | storage | | | | | | | | | | | | | | | | |
| mgmt | 192.168.11.1 | ⇅ | 192.168.11.2 | mgmt | | | | | | | | | | | | | | | | |
| service | 192.168.51.1 | ⇅ | 192.168.51.2 | service | | | | | | | | | | | | | | | | |
| service | 192.168.59.1 | ⇅ | 192.168.59.2 | service | | | | | | | | | | | | | | | | |
| migrate | 192.168.19.1 | ⇅ | 192.168.19.2 | migrate | | | | | | | | | | | | | | | | |
| storage | 192.168.27.1 | ⇅ | 192.168.27.2 | storage | | | | | | | | | | | | | | | | |

LINKUP_OK (CHECK OF MANAGEMENT LAN COMMUNICATION STATE)
SPEED_OK (CHECK OF COMMUNICATION BAND STATE)
CONNECTIVITY_OK (CHECK OF CONNECTION AND VLAN SETTING STATE)

| SERVER | SLOT | PORT | MANAGEMENT LAN | vMotion LAN | vSAN LAN | BUSINESS LAN |
|---|---|---|---|---|---|---|
| SERVER sv1 | SLOT st0 | PORT P0 | Fail | Fail | Fail | Fail |
| | | PORT P1 | Fail | Fail | Fail | Fail |
| | SLOT st1 | PORT P0 | OK | OK | OK | OK |
| | | PORT P1 | OK | OK | OK | OK |

DHCP_OK (CHECK OF DHCP SERVER SETTINGS)
DNS_OK (CHECK OF DNS SERVER SETTINGS)
NTP_OK (CHECK OF NTP SERVER SETTINGS)

FIG. 24

LINKUP_OK (CHECK OF MANAGEMENT LAN COMMUNICATION STATE)
SPEED_OK (CHECK OF COMMUNICATION BAND STATE)
CONNECTIVITY_OK (CHECK OF CONNECTION AND VLAN SETTING STATE)

| SERVER | SLOT | PORT | MANAGEMENT LAN | vMotion LAN | vSAN LAN | BUSINESS LAN |
|---|---|---|---|---|---|---|
| SERVER sv1 | SLOT st0 | PORT P0 | OK | OK | Fail | OK |
| | | PORT P1 | OK | OK | OK | OK |
| | SLOT st1 | PORT P0 | OK | OK | OK | OK |
| | | PORT P1 | OK | OK | OK | OK |

DHCP_OK (CHECK OF DHCP SERVER SETTINGS)
DNS_OK (CHECK OF DNS SERVER SETTINGS)
NTP_OK (CHECK OF NTP SERVER SETTINGS)

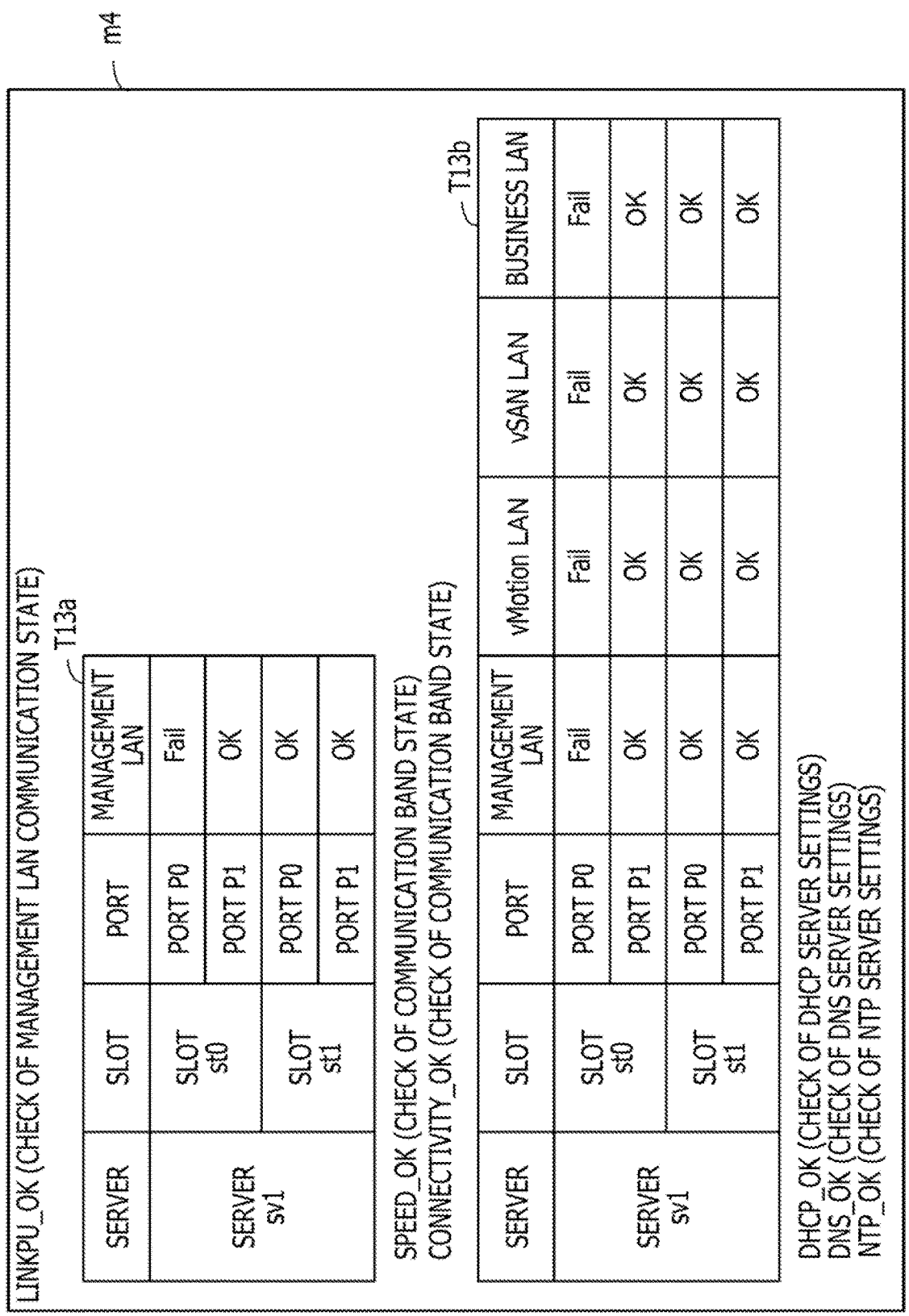

FIG. 26

LINKUP_OK (CHECK OF MANAGEMENT LAN COMMUNICATION STATE)

SPEED_OK (CHECK OF COMMUNICATION BAND STATE)

| SERVER | SLOT | PORT | RESULT |
|---|---|---|---|
| SERVER sv1 | SLOT st0 | PORT P0 | Fail |
| | | PORT P1 | OK |
| | SLOT st1 | PORT P0 | OK |
| | | PORT P1 | OK |

CONNECTIVITY_OK (CHECK OF CONNECTION AND VLAN SETTING STATE)

DHCP_OK (CHECK OF DHCP SERVER SETTINGS)

DNS_OK (CHECK OF DNS SERVER SETTINGS)

NTP_OK (CHECK OF NTP SERVER SETTINGS)

FIG. 27 m6

LINKUP_OK (CHECK OF MANAGEMENT LAN COMMUNICATION STATE)

SPEED_OK (CHECK OF COMMUNICATION BAND STATE)

CONNECTIVITY_OK ((CHECK OF CONNECTION AND VLAN SETTING STATE)

DHCP_OK (CHECK OF DHCP SERVER SETTINGS)

T15a

| SERVER | RESULT |
|---|---|
| ALL SERVERS | Fail |

DNS_OK (CHECK OF DNS SERVER SETTINGS)

T15b

| SERVER | RESULT |
|---|---|
| ALL SERVERS | Fail |

NTP_OK (CHECK OF NTP SERVER SETTINGS)

T15c

| SERVER | RESULT |
|---|---|
| ALL SERVERS | Fail |

INFORMATION PROCESSING DEVICE, INFORMATION PROCESSING SYSTEM, AND NETWORK COMMUNICATION CONFIRMATION METHOD

CROSS-REFERENCE TO RELATED APPLICATION

This application is based upon and claims the benefit of priority of the prior Japanese Patent Application No. 2020-10918, filed on Jan. 27, 2020, the entire contents of which are incorporated herein by reference.

FIELD

The embodiments discussed herein are related to an information processing device, an information processing system, and a network communication confirmation method.

BACKGROUND

In recent years, technologies of virtualization infrastructure (hyper converged infrastructure (HCI)) in which information and communication technology (ICT) infrastructures are integrated into one system have been developed.

The virtualization infrastructure aggregates functions of computing and storage by a plurality of servers. Furthermore, an externally connected shared storage device is unnecessary, and an internal storage of a server can be used as a virtual shared storage that can be accessed from all the servers, using a software defined storage (SDS) technology.

The virtualization infrastructure has a simple configuration and can be used by controlling resources by software on a server, and also is highly expandable. Therefore, the virtualization infrastructure has characteristics, for example, that introduction and operation management are easy, and the virtualization infrastructure can be easily scaled out by adding servers in a case where the resources become insufficient.

In constructing such a virtualization infrastructure network, operation management software in a server automatically performs construction, addition, settings of operation information, and the like.

As a technology related to the network construction, for example, a technology of determining a combination of communication confirmation between virtual machines (VMs) and confirming a state of a logical communication section, and determining a combination of communication confirmation between physical devices and confirming a state of a physical communication section has been proposed.

Furthermore, a technology of determining whether predetermined settings corresponding to design information are applicable in a case of comparing physical connection information with the design information and determining that there is an error in a connection relationship has been proposed. Moreover, a technology of causing a communication traffic to flow in a virtual network system and monitoring a communication status, thereby verifying an operation of the virtual network system including communication confirmation of communication with constituent elements has been proposed.

For example, Japanese Laid-open Patent Publication No. 2016-201760, Japanese Laid-open Patent Publication No. 2018-110345, Japanese Laid-open Patent Publication No. 2014-154925, and the like are disclosed as related art.

SUMMARY

According to an aspect of the embodiments, an information processing device, includes a memory; and a processor coupled to the memory and configured to: store, in the memory, a confirmation program for performing communication confirmation of a network, transmit the confirmation program to a server in the network, collect an execution result of the communication confirmation transmitted from the server by causing the server to execute the communication confirmation, and perform correctness determination of the execution result The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 17 is a diagram illustrating an example of a communication state between servers;

FIG. 18 is a diagram illustrating an example of allocation of a temporary Internet protocol (IP) address to an unconstructed server;

FIG. 23 is a diagram illustrating an example of the network communication confirmation result display;

FIG. 24 is a diagram illustrating an example of the network communication confirmation result display;

FIG. 25 is a diagram illustrating an example of the network communication confirmation result display;

FIG. 26 is a diagram illustrating an example of the network communication confirmation result display; and FIG. 27 is a diagram illustrating an example of a network communication confirmation result display.

DESCRIPTION OF EMBODIMENTS

In constructing a virtualization infrastructure network, manual operations such as settings of a switch connecting a server and a local area network (LAN) and connecting network cables are performed before activating automatic construction by operation management software.

However, if there is an incorrect setting in the manual operation stage, an error message is output at each processing stage of the automatic construction, so an operator manually corrects the error each time the error message rises and executes the operation management software again, and rework occurs. For this reason, there is a demand for a technology capable of automatically detecting an incorrect setting before the network is constructed on the basis of the automatic construction of the operation management software.

In view of the foregoing, it is desirable to enable detection of an incorrect setting before the network construction.

Hereinafter, the present embodiments will be described with reference to the drawings.

First Embodiment

Figure 1:
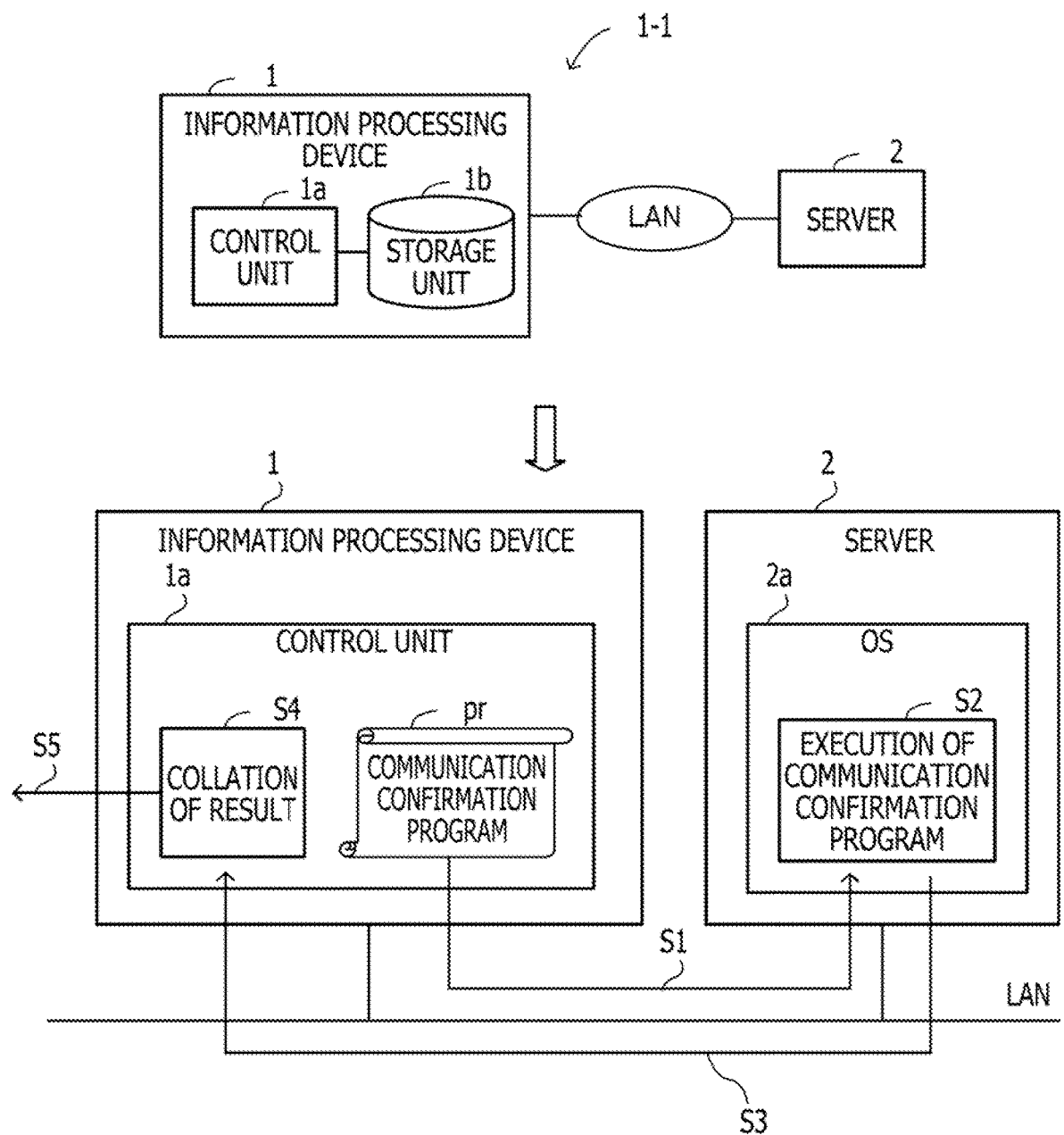
FIG. 1 is a diagram for describing an example of an information processing system.

First, a first embodiment will be described with reference to FIG. 1. FIG. 1 is a diagram for describing an example of an information processing system. An information processing system 1-1 includes an information processing device 1 and a server 2, and the information processing device 1 and the server 2 are connected via a LAN. Note that there may be a plurality of the servers 2. Furthermore, the information processing device 1 is a server or a maintenance terminal.

The information processing device 1 includes a control unit 1a and a storage unit 1b. The storage unit 1b stores a communication confirmation program for performing communication confirmation of a network. Note that the network here is an information communication environment including the information processing system 1-1.

The control unit 1a transmits the communication confirmation program to the server 2 arranged in the network, causes the server 2 to execute the communication confirmation, collects an execution result transmitted from the server 2, and performs correctness determination of the execution result. Note that the function of the control unit 1a is implemented by a processor (not illustrated) executing a predetermined program, the processor being included in the information processing device 1.

An operation will be described using the example illustrated in FIG. 1.

[step S1] The control unit 1a in the information processing device 1 transmits a communication confirmation program pr for performing communication confirmation for constructing a network to the server 2.

[step S2] An operating system (OS) 2a in the server 2 executes the communication confirmation program pr.

[step S3] The OS 2a transmits an execution result of the communication confirmation program pr to the information processing device 1.

[step S4] The control unit 1a collates the execution result transmitted from the server 2 with a table illustrating a communication state for correctness determination (assumed communication state) to perform correctness determination.

[step S5] The control unit 1a notifies a correctness result using a graphical user interface (GUI).

As described above, the information processing system 1-1 transmits the communication confirmation program to the server and causes the server to execute the communication confirmation, and collates the execution result transmitted from the server with the assumed communication state to perform correctness determination. Thereby, an incorrect setting before network construction can be detected.

Second Embodiment

Next, a second embodiment in which functions of an information processing system 1-1 are applied to a virtualization infrastructure system will be described. First, a configuration of the virtualization infrastructure system will be described.

<Virtualization Infrastructure System>

Figure 2:
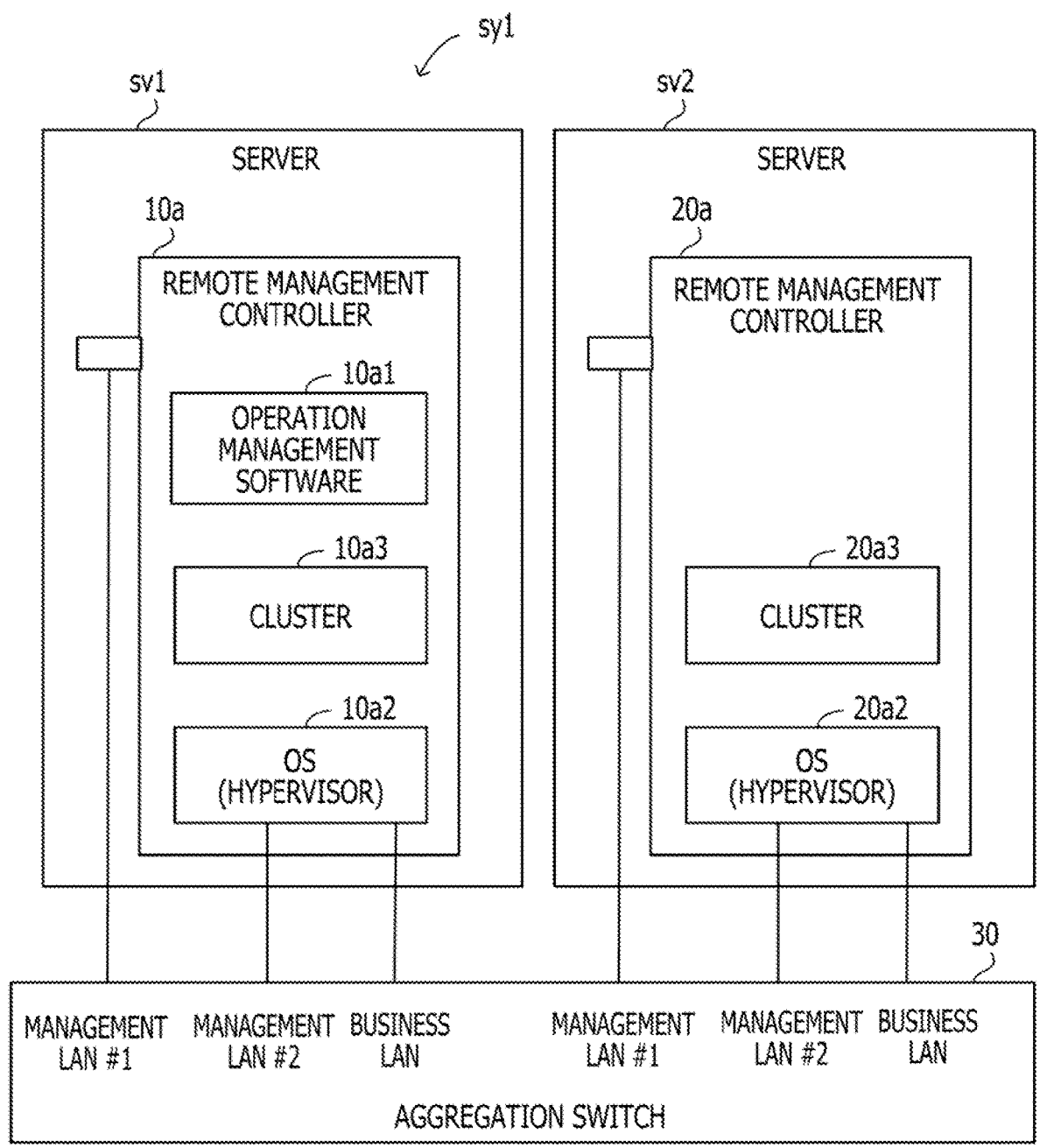
FIG. 2 is a diagram illustrating an example of a configuration of a virtualization infrastructure system.

FIG. 2 is a diagram illustrating an example of a configuration of a virtualization infrastructure system. A virtualization infrastructure system sy1 includes servers sv1 and sv2 and an aggregation switch (network switch) 30. The server sv1 includes a remote management controller (IRMC) 10a, and the server sv2 includes a remote management controller 20a.

An aggregation switch 30 connects the remote management controller 10a to management LANs #1 and #2 and a business LAN, and connects the remote management controller 20a to management LANs #1 and #2 and a business LAN.

The management LAN is a management network used for system management, and the business LAN is a business network used for operating a business. The management LAN and the business LAN are divided into a plurality of virtual LANs (VLANs) due to security policy and network performance requirements, and LAN settings are flexible for each platform user.

Note that the management LAN #1 is a LAN used when, for example, powering on/off/rebooting the server or installing an OS, and the management LAN #2 is a LAN used in, for example, communication after installing the OS on the server.

The remote management controller 10a includes operation management software 10a1, an OS 10a2, and a cluster 10a3, and the remote management controller 20a includes an OS 20a2 and a cluster 20a3. The OSs 10a2 and 20a2 in the servers sv1 and sv2 are also called hypervisors. Furthermore, the clusters 10a3 and 20a3 are application software that clusters a plurality of computers.

The operation management software 10a1 arranged in the server sv1 is software for automating settings for each device that occur at the time of system construction, addition, and operation. The operation management software 10a1 may be included in at least one server in the system.

Since the operation management software 10a1 centrally manages each device, automation of various operations is implemented.

<Work Procedure at System Introduction>

Figure 3:
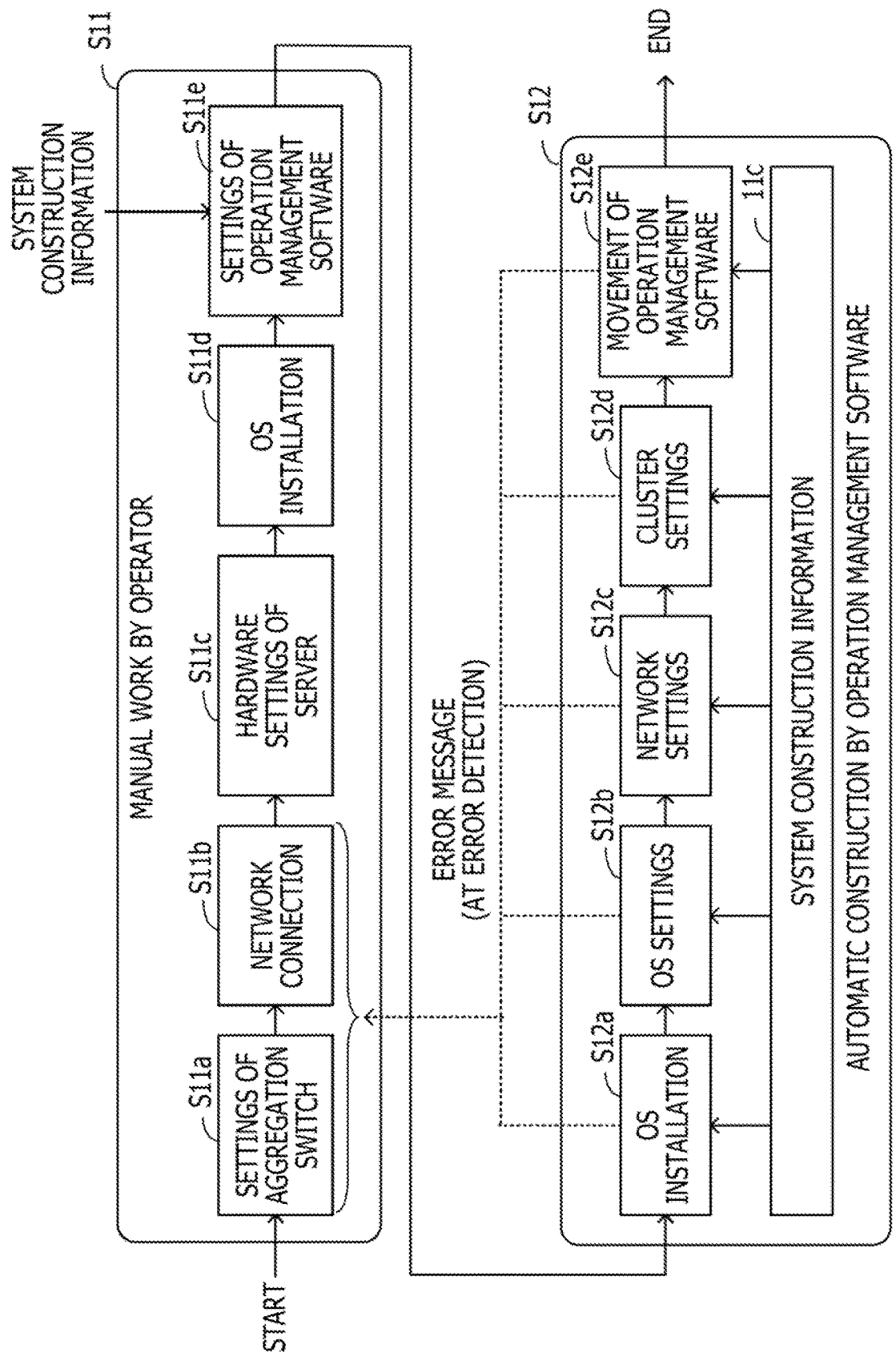
FIG. 3 is a diagram illustrating an example of a work procedure at the time of introducing the system.

FIG. 3 is a diagram illustrating an example of a work procedure at the time of introducing the system. FIG. 3 illustrates a work procedure before the embodiments are applied. Step S11 illustrates a flow of manual work up to operating the operation management software for the first server. Step S12 illustrates a flow of performing automatic construction for the second and subsequent servers by the operation management software.

[step S11a] The aggregation switch 30 is set.

[step S11b] Network connection (line connection) between the aggregation switch 30 and the server is performed.

[step S11c] The server hardware is set.

[step S11d] The OS is installed on the server.

[step S11e] System construction information is imported to the server and the operation management software is set. The system construction information includes configuration information (connection information between servers, and the like), construction materials (installation media), and a set value list. Note that the set value list includes, for example, various parameters (an internet protocol (IP) address, a computer name, and the like) obtained by hearing from a customer.

[step S12a] The operation management software installs the OSs for the number of servers to the respective servers.

[step S12b] The operation management software sets the OSs for the number of servers.

[step S12c] The operation management software performs network settings for the number of servers.

[step S12d] The operation management software performs cluster settings for the number of servers.

[step S12e] The operation management software is moved.

As described above, in step S11, the construction by manual operation up to operating the operation management software is performed. Furthermore, in step S12, the automatic construction by the operation management software is performed, and the construction from the start of installation of the OSs for the second and subsequent servers to a state where the system can be operated is automatically performed.

Note that, since step S12 is operable on the assumption that steps S11a and S11b are correctly set, in a case where there is an error in the settings of the aggregation switch 30 or in the network connection, the problem is detected in each construction processing of the operation management software, and an error message is displayed for the user.

In the case where the error message is displayed, the user checks the settings of the aggregation switch 30 and the network connection, manually corrects the error, and then executes the operation management software again. Furthermore, since a plurality of setting errors (including connection errors) can occur at the same time, repetitive work of steps S11 and S12 may occur.

<Example of Incorrect Setting of Network>

Figure 4:
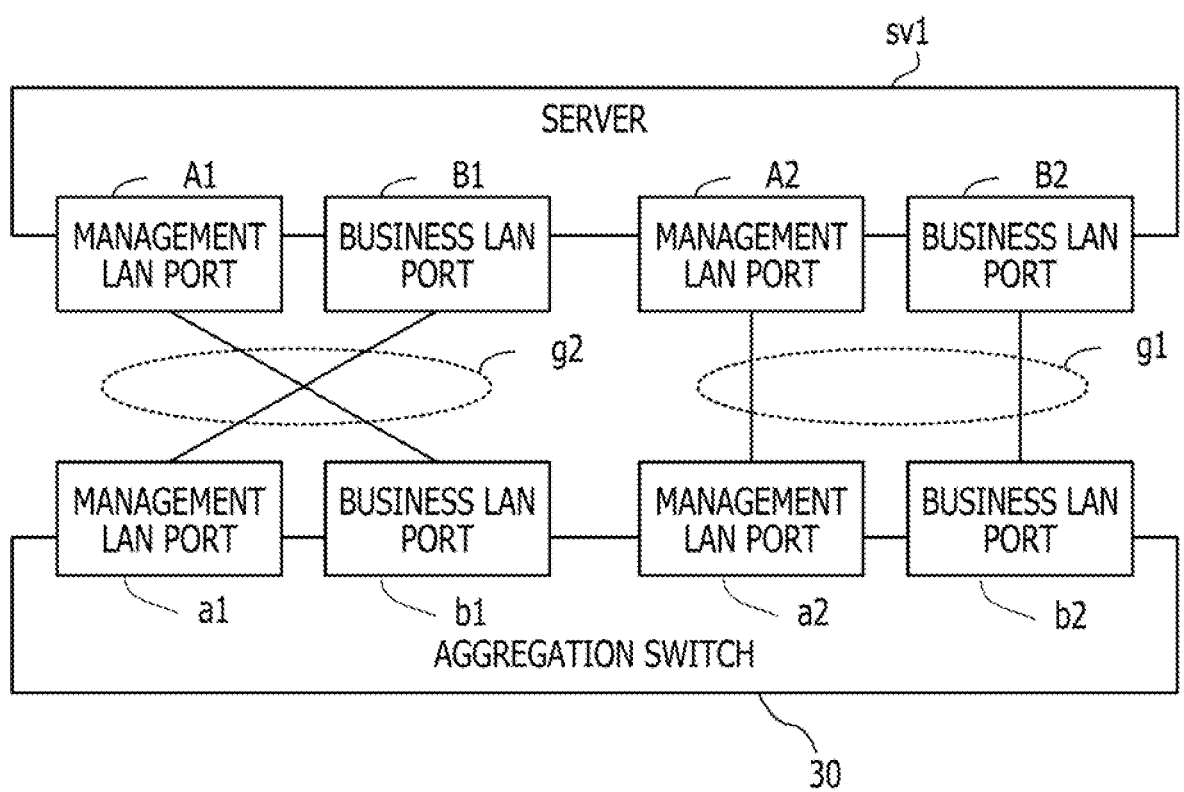
FIG. 4 is a diagram illustrating an example of an error in connecting a network cable.

Examples of incorrect setting of a network will be described with reference to FIGS. 4 to 8. FIG. 4 is a diagram illustrating an example of an error in connecting a network cable. The server sv1 includes management LAN ports A1 and A2 and business LAN ports B1 and B2. The aggregation switch 30 includes management LAN ports a1 and a2 and business LAN ports b1 and b2.

In a state g1, the management LAN port A2 and the management LAN port a2 are connected and the business LAN port B2 and the business LAN port b2 are connected, which are in a correct connection state.

Meanwhile, in a state g2, the management LAN port A1 and the business LAN port b1 are connected and the business LAN port B1 and the management LAN port a1 are connected, which are in an incorrect connection state where the management LAN ports and the business LAN ports are opposite.

If there is such a network incorrect setting due to a connection error, the automatic construction of the operation management software stops and an error message is transmitted.

Figure 5:
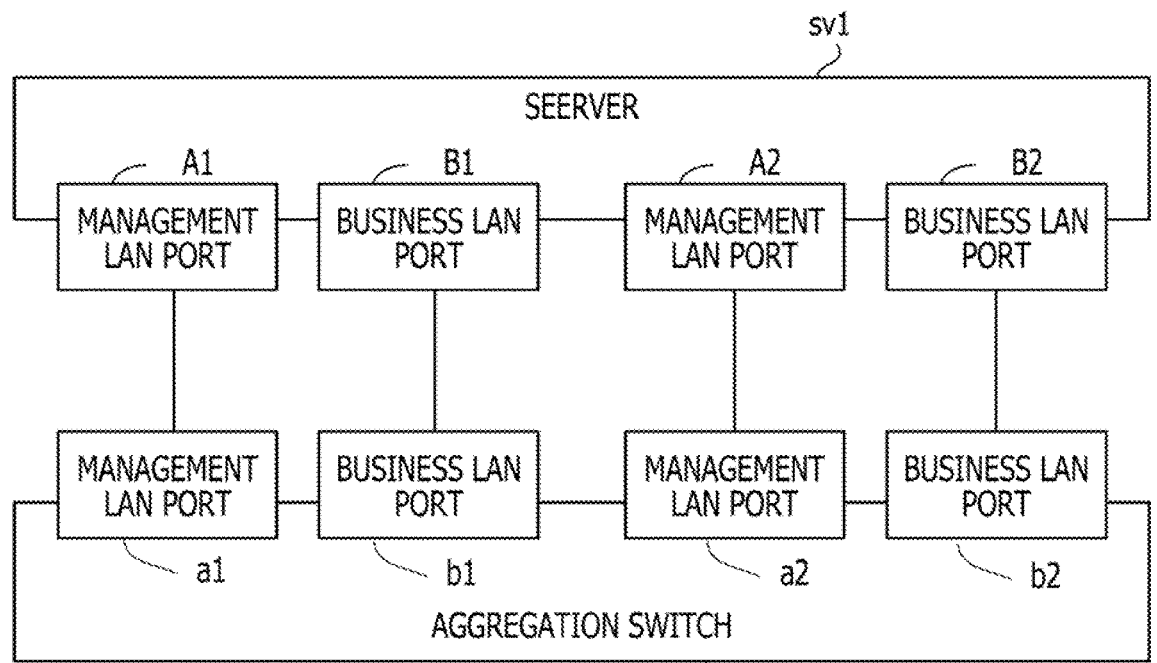
FIG. 5 is a diagram illustrating an example of a virtual local area network (VLAN) setting error.

FIG. 5 is a diagram illustrating an example of a VLAN setting error. In the connection between the server sv1 and the aggregation switch 30, the management LAN port A1 and the management LAN port a1 are connected and the business LAN port B1 and the business LAN port b1 are connected. Furthermore, the management LAN port A2 and the management LAN port a2 are connected and the business LAN port B2 and the business LAN port b2 are connected. All the physical connections are assumed to be correct.

Table Ta1 includes items of a management LAN_tag (tag) VLAN, a vMotion_tag VLAN, a vSAN_tag VLAN, and a business LAN_tag VLAN, and illustrates a setting status of the ports on the aggregation switch 30 side.

Note that vMotion and vSAN are functions provided by VMware (registered trademark), and vMotion moves (migrates) a virtual machine running in a server to another server without shutting the virtual machine down. Furthermore, vSAN virtually bundles storages and provides the storages as a single shared storage. The vMotion_tag VLAN is a VLAN used when performing vMotion, and the vSAN_tag VLAN is a VLAN used when performing vSAN.

In the table Ta1, the port b1 has already been set to the business LAN_tag VLAN, the port a2 has already been set to the management LAN_tag VLAN, vMotion_tag VLAN, and vSAN_tag VLAN, and the port b2 has already been set to the business LAN tag VLAN.

Meanwhile, the port a1 has already been set to the management VLAN_tag VLAN and vMotion_tag VLAN but the vSAN_tag VLAN has been incorrectly set. Examples of the VLAN setting error include setting omission and discordance with the set value list.

If there is such a network incorrect setting due to a VLAN setting error, the automatic construction of the operation management software stops and an error message is transmitted.

Figure 6:
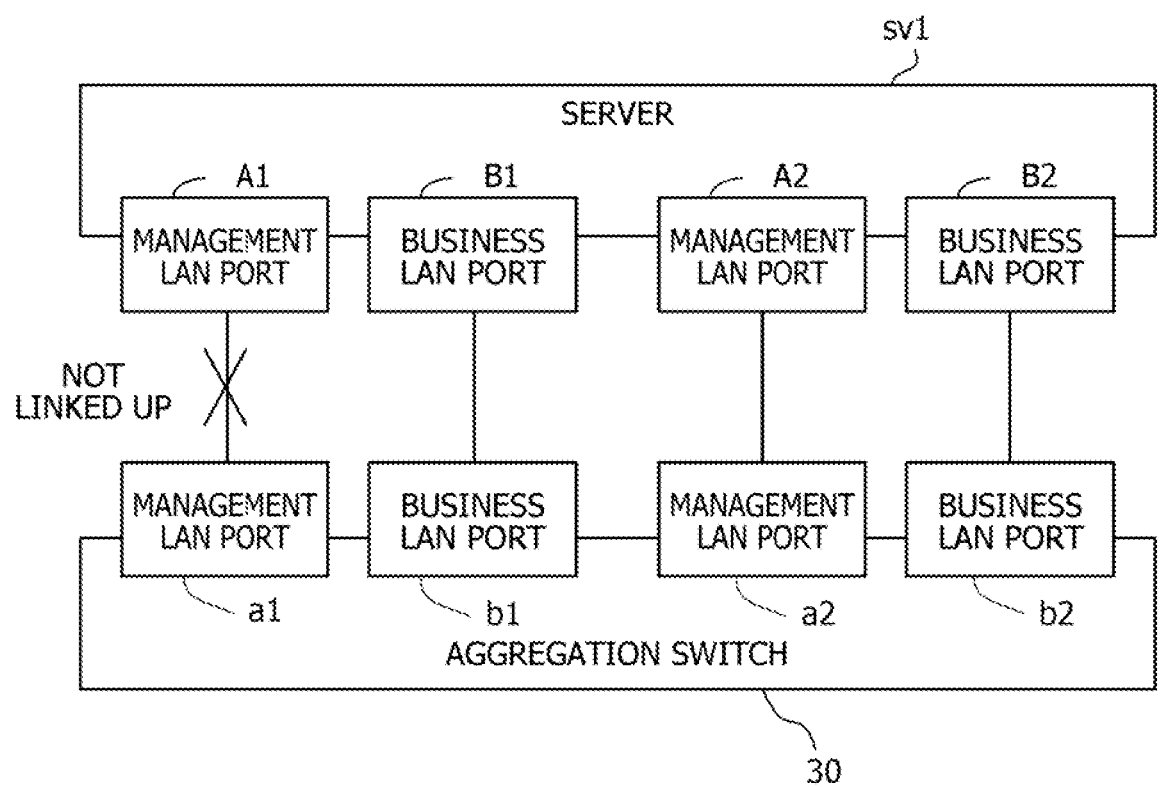
FIG. 6 is a diagram illustrating an example of a connection trouble of a network cable.

FIG. 6 is a diagram illustrating an example of a connection trouble of a network cable. In the connection between the server sv1 and the aggregation switch 30, the business LAN port B1 and the business LAN port b1 are connected, the management LAN port A2 and the management LAN port a2 are connected, and the business LAN port B2 and the business LAN port b2 are connected, which are respectively linked up.

Meanwhile, the management LAN port A1 and the management LAN port a1 are in a state of not being linked up (they are in a state in which communication is disabled for some reason). If there is such a line that is not linked up due to network incorrect setting, the automatic construction of the operation management software stops and an error message is transmitted.

Figure 7:
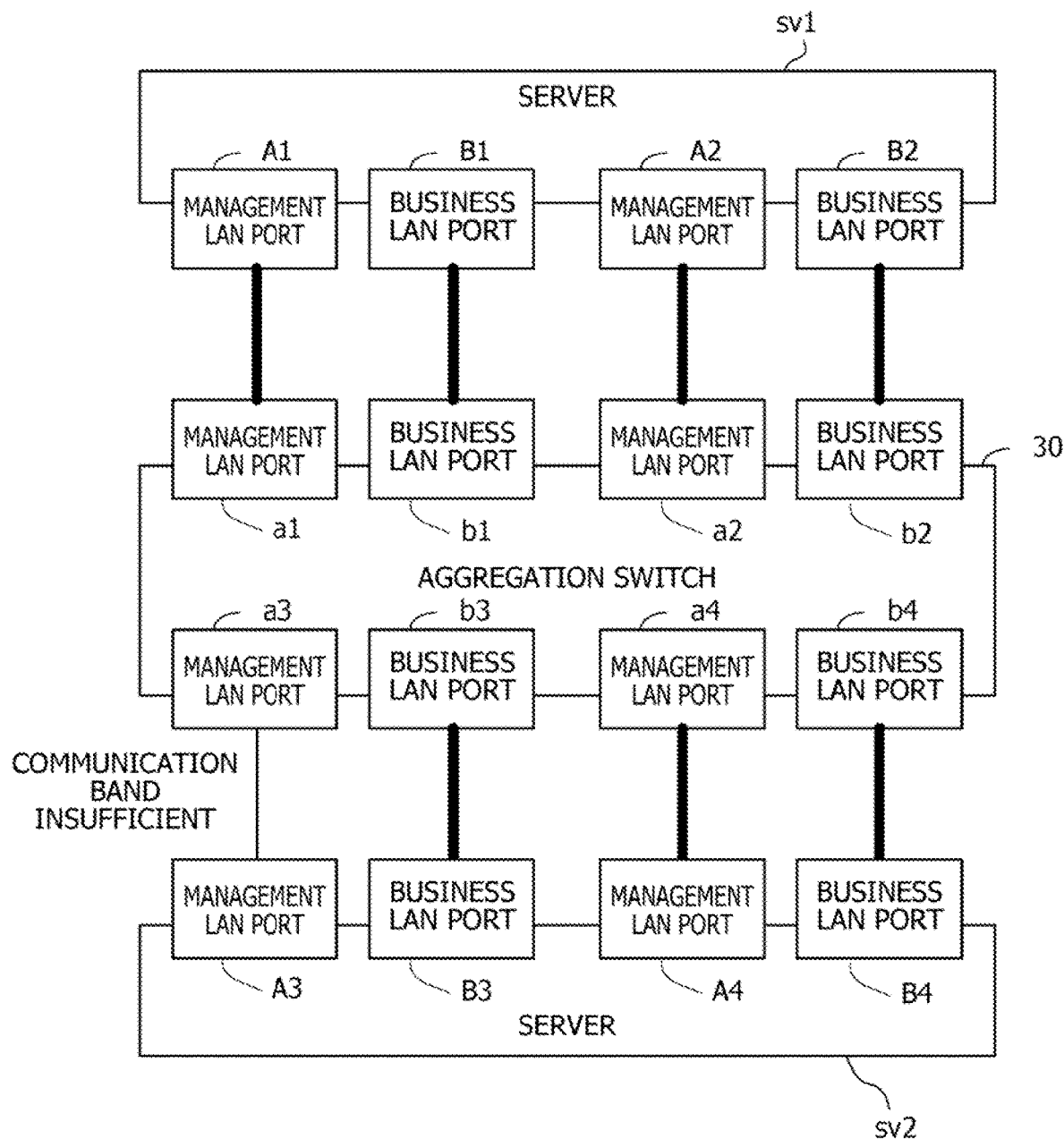
FIG. 7 is a diagram illustrating an example of communication band shortage.

FIG. 7 is a diagram illustrating an example of communication band shortage. The server sv1 includes the management LAN ports A1 and A2 and the business LAN ports B1 and B2, and the server sv2 includes management LAN ports A3 and A4 and business LAN ports B3 and B4. The aggregation switch 30 includes the management LAN ports a1, ..., and a4 and the business LAN ports b1, ..., and b4.

The management LAN port A1 and the management LAN port a1 are connected, and the business LAN port B1 and the business LAN port b1 are connected. The management LAN port A2 and the management LAN port a2 are connected, and the business LAN port B2 and the business LAN port b2 are connected.

The management LAN port A3 and the management LAN port a3 are connected, and the business LAN port B3 and the business LAN port b3 are connected. The management LAN port A4 and the management LAN port a4 are connected, and the business LAN port B4 and the business LAN port b4 are connected.

Here, a communication band between the management LAN port A3 and the management LAN port a3 exceeds a communication band of the aggregation switch 30 and a band shortage occurs. If there is such a network incorrect setting in which a band shortage occurs, the automatic construction of the operation management software stops and an error message is transmitted.

Figure 8:
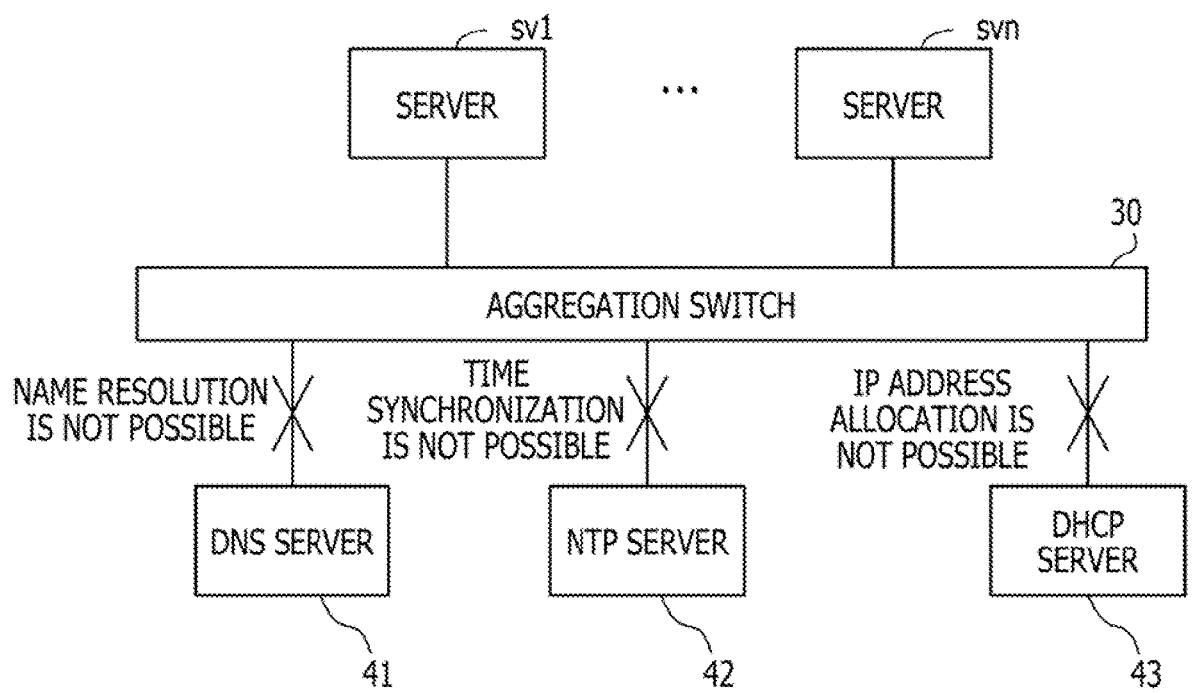
FIG. 8 is a diagram illustrating an example in a case where a network service by an external server cannot be used.

FIG. 8 is a diagram illustrating an example in a case where a network service by an external server cannot be used. The servers sv1, ..., and svn are connected to the aggregation switch 30. Moreover, as external servers, for example, a domain name system (DNS) server 41, a network time protocol (NTP) server 42, and a dynamic host configuration protocol (DHCP) server 43 are connected to the aggregation switch 30.

In such a configuration, if there is a network incorrect setting for an external server, a network service cannot be used. Examples where a network service cannot be used include name resolution by the DNS server 41 being not possible, time synchronization by the NTP server 42 being not possible, and IP address allocation by the DHCP server 43 being not possible.

If there is such a network incorrect setting by which the network service for the external server becomes unavailable, the automatic construction of the operation management software stops and an error message is transmitted.

Here, as described above, the management LAN #1 is a LAN used when powering on/off/rebooting the server or installing an OS, so connection regarding the management LAN #1 is done at the beginning of the work. For this reason, incorrect setting of the management LAN #1 is likely to be detected at an early stage.

Meanwhile, the management LAN #2 is a LAN used in communication after the OS is installed to the server, and the business LAN is also a LAN used after the OS is installed, so the network communication state can be confirmed only after the OS is installed.

Therefore, in the past, set values have been visually checked before installing the OS. However, if there has been a visual check error, an error has been detected in the middle of the automatic construction by the operation management software, and setting rework has occurred.

The embodiments have been made in view of the above circumstances, and is intended to prevent network setting errors before constructing the network.

<Management Server>

Figure 9:
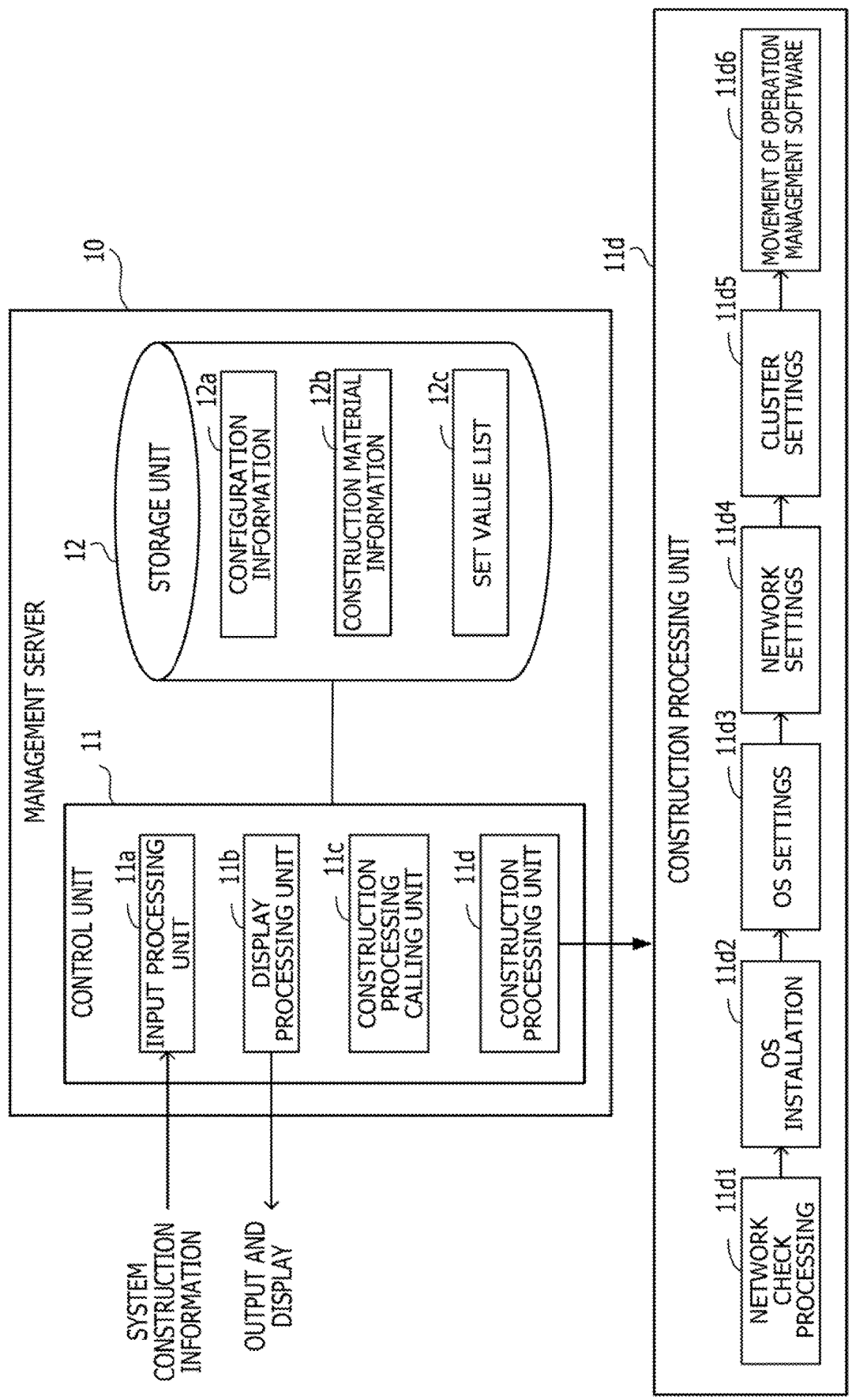
FIG. 9 is a diagram illustrating an example of functional blocks of a management server.

The second embodiment will be described below. FIG. 9 is a diagram illustrating an example of functional blocks of a management server. A management server 10 includes a control unit 11 and a storage unit 12. The management server 10 implements the functions of the information processing device 1 illustrated in FIG. 1. The control unit 11 corresponds to the control unit 1a in FIG. 1, and the storage unit 12 corresponds to the storage unit 1b in FIG. 1.

The control unit 11 executes the function of the remote management controller and also executes the operation of the operation management software. Moreover, the control unit 11 includes an input processing unit 11a, a display processing unit 11b, a construction processing calling unit 11c, and a construction processing unit 11d.

The input processing unit 11a performs input processing for the system construction information (configuration information, construction materials, set value list, and the like) input by the operator and stores the system construction information in the storage unit 12. The construction processing unit 11d performs plurality of pieces of construction processing related to network construction on the basis of the system construction information. The plurality of pieces of construction processing include network check processing 11d1, OS installation 11d2, OS setting 11d3, network setting 11d4, cluster setting 11d5, and operation management software movement 11d6.

The construction processing calling unit 11c calls the construction processing performed by the construction processing unit 11d. The display processing unit 11b outputs and displays content of the construction processing called by the construction processing calling unit 11c, a collation result, an error message, and the like. The storage unit 12 stores the system construction information in which input processing is performed by the input processing unit 11a. Examples of the system construction information include configuration information 12a, construction material information 12b, and a set value list 12c.

<Hardware Configuration>

Figure 10:
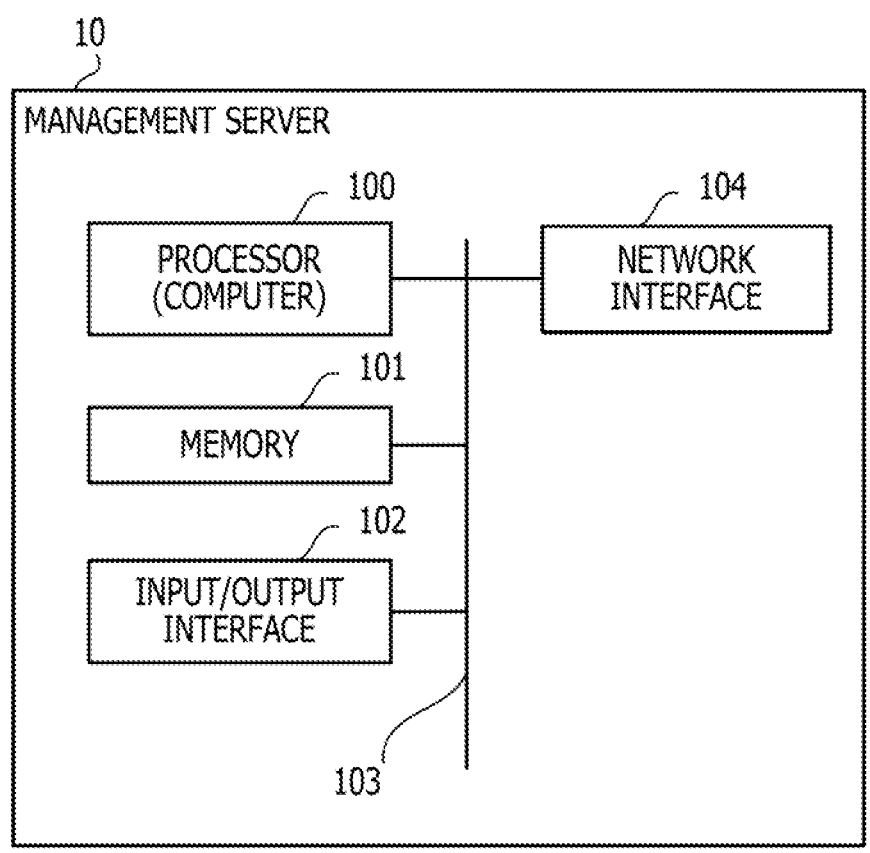
FIG. 10 is a diagram illustrating an example of a hardware configuration of the management server.

FIG. 10 is a diagram illustrating an example of a hardware configuration of the management server. The management server 10 is entirely controlled by a processor (computer) 100. The processor 100 implements the function of the control unit 11.

A memory 101, an input/output interface 102, and a network interface 104 are connected to the processor 100 via a bus 103.

The processor 100 may also be a multiprocessor. The processor 100 is, for example, a central processing unit (CPU), a micro processing unit (MPU), a digital signal processor (DSP), an application specific integrated circuit (ASIC), or a programmable logic device (PLD). Furthermore, the processor 100 may be a combination of two or more elements of the CPU, MPU, DSP, ASIC, and PLD.

The memory 101 implements the function of the storage unit 12 and is used as a main storage device of the management server 10. The memory 101 temporarily stores at least part of an OS program and application programs to be executed by the processor 100. Furthermore, the memory 101 stares various data required in processing by the processor 100.

Furthermore, the memory 101 is also used as an auxiliary storage device of the management server 10, and stores the OS program, application programs, and various data. The memory 101 may include a semiconductor storage device such as a flash memory or a solid state drive (SSD) or a magnetic recording medium such as a hard disk drive (HDD) as the auxiliary storage device.

Peripheral devices connected to the bus 103 include the input/output interface 102 and the network interface 104. The input/output interface 102 can be connected to information input devices such as a keyboard and a mouse, and transmits a signal sent from the information input device to the processor 100.

Furthermore, the input/output interface 102 also functions as a communication interface for connecting peripheral devices. For example, the input/output interface 102 can be connected to an optical drive device that reads data recorded on an optical disk using laser light or the like. Examples of the optical disk include a Blu-ray disc (registered trademark), a compact disc read only memory (CD-ROM), and a CD-recordable/recordable (R/RW).

Furthermore, the input/output interface 102 can be connected to a memory device and a memory reader/writer. The memory device is a recording medium having a communication function with the input/output interface 102. The memory reader/writer is a device that writes data in a memory card or reads data from the memory card. The memory card is a card-type recording medium.

The network interface 104 is connected to the network and performs network interface control. As the network interface 104, for example, a network interface card (NIC), a wireless local area network (LAN) card, or the like can be used. The data received by the network interface 104 is output to the memory 101 and the processor 100.

The processing function of the management server 10 can be implemented by the above-described hardware configuration. For example, the management server 10 can perform the processing of the embodiments by the processor 100 executing a predetermined program.

The management server 10 implements the processing function of the embodiments by executing, for example, the program recorded in a computer-readable recording medium. The program in which processing content to be executed by the management server 10 is described may be recorded in various recording media.

For example, the program to be executed by the management server 10 can be stored in the auxiliary storage device. The processor 100 loads at least a part of the program in the auxiliary storage device onto the main storage device and executes the program.

Furthermore, the program can be recorded in a portable recording medium such as an optical disk, a memory device, or a memory card. The program stored in the portable recording medium becomes executable after being installed on the auxiliary storage device by the control of the processor 100, for example. Furthermore, the processor 100 can directly read the program from the portable recording medium and execute the program.

<Processing Procedure at System Introduction>

Figure 11:
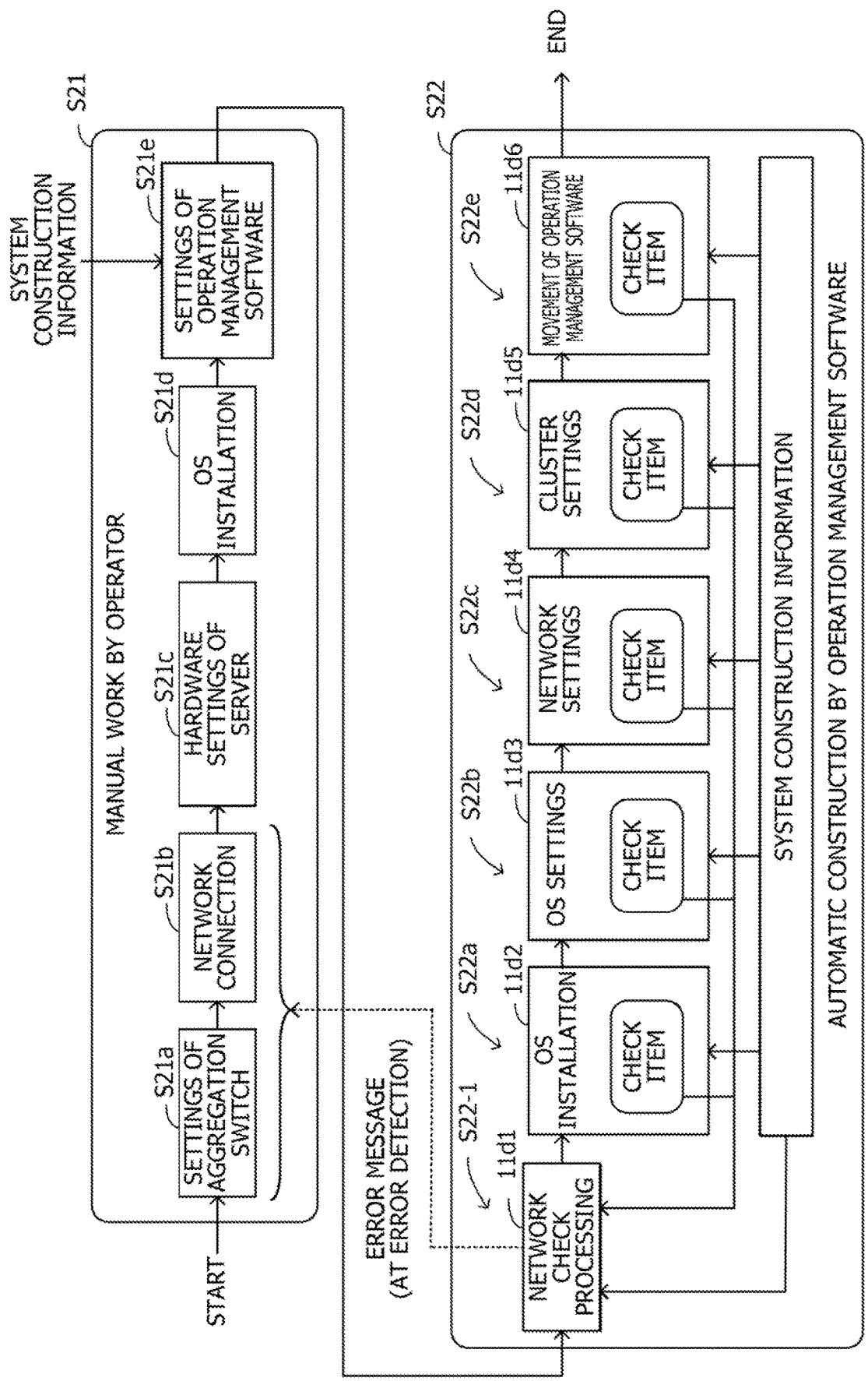
FIG. 11 is a diagram illustrating an example of a work procedure at the time of introducing the system.

FIG. 11 is a diagram illustrating an example of a work procedure at the time of introducing the system. FIG. 11 illustrates a work procedure in the case where the embodiments are applied. Step S21 illustrates a flow of manual work up to operating the operation management software for the first server. Step S22 illustrates a flow of performing the automatic construction for the second and subsequent servers by the operation management software.

[step S21a] The aggregation switch 30 is set.

[step S21b] The network connection (line connection) between the aggregation switch 30 and the server is performed.

[step S21c] The server hardware is set.

[step S21d] The OS is installed on the server.

[step S21e] The system construction information is imported to the server and the operation management software is set.

[step S22-1] The operation management software performs the network check processing. In this case, the operation management software performs the network check processing based on the check items of each of the processing stages (OS installation 11d2, OS setting 11d3, network setting 11d4, duster setting 11d5, and operation management software movement 11d6) using the system construction information.

[step S22a] The operation management software installs the OSs for the number of servers.

[step S22b] The operation management software sets the OSs for the number of servers.

[step S22c] The operation management software performs network settings for the number of servers.

[step S22d] The operation management software performs duster settings for the number of servers.

[step S22e] The operation management software is moved.

Here, the network check processing 11d1 will be described. The network check processing 11d1 is a mechanism for checking the network of the system on the basis of the communication confirmation program using the system construction information.

The network check processing 11d1 can easily deal with a case where the set value is changed or additional setting processing occurs. Furthermore, the network check processing 11d1 can be used not only at the time of introducing the system but also during the system operation. Furthermore, the network check processing 11d1 can be used at the time of relocating the system or at the time of expanding the system.

At the time of relocating the system, whether or not connection and switch settings are appropriate can be confirmed by changing the set value list in accordance with a network configuration of a relocation destination and operating only the network check processing after the relocation of the system, for example.

Furthermore, at the time of expanding the system, whether or not the connection and switch settings are appropriate can be confirmed by adding a network set value of an additional server to the set value list and operating the network check processing 11d1 and setting processing for the additional server.

<Activation of Network Check Processing>

Figure 12:
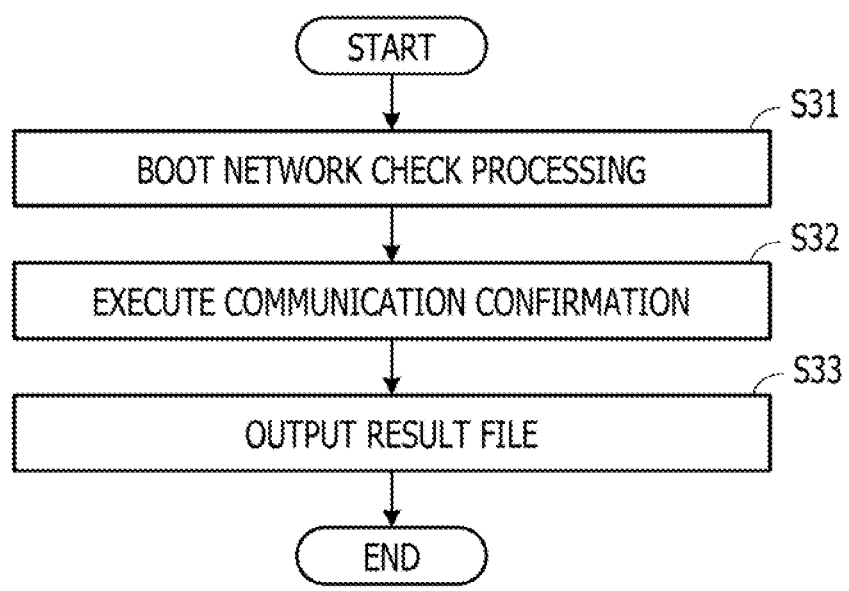
FIG. 12 is a flowchart illustrating an example of activation of network check processing.

FIG. 12 is a flowchart illustrating an example of activation of the network check processing.

[step S31] In a case where there is an unconstructed server, a network check processing OS (NWCK-OS) included in the control unit 11 (operation management software) is booted. In this case, the control unit 11 mounts the network check processing OS on each server and activates the OS. Alternatively, the network check processing OS can be published on a trivial file transfer protocol (TFTP) server, and the network check processing OS can be activated by preboot execution environment (PXE) boot from the TFTP server.

[step S32] The network check processing OS transmits the communication confirmation program (including the set value list and check items) to all the servers and performs the communication confirmation between the servers and the network services.

[step S33] The network check processing OS outputs a result to a file. In the following description, the network check processing OS may be called network checker.

<Flow of Network Check Processing>

Figure 13:
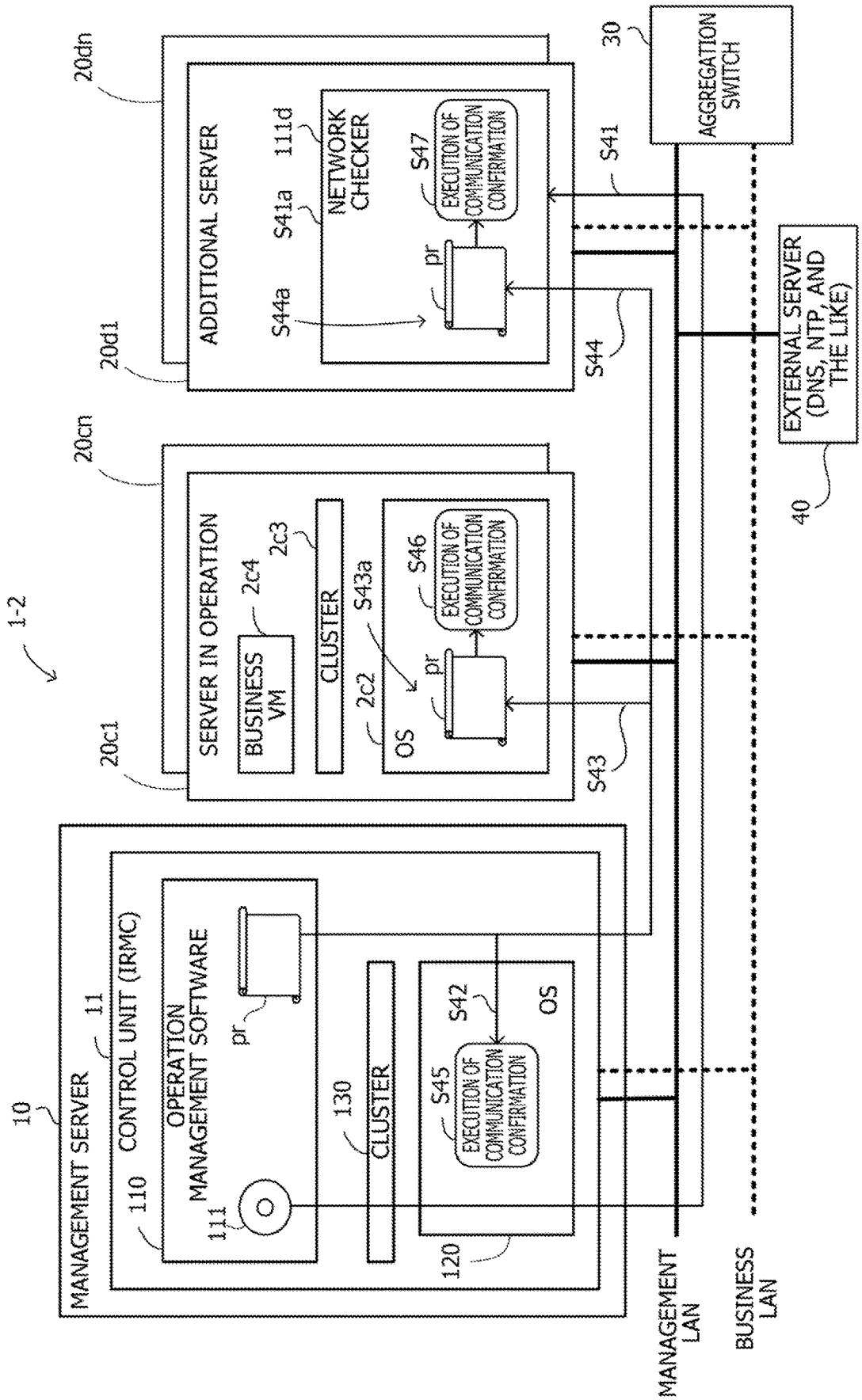
FIG. 13 is a diagram illustrating an example of a flow of mounting and communication confirmation of a network checker.

FIG. 13 is a diagram illustrating an example of a flow of mounting and communication confirmation of a network checker. An information processing system 1-2 includes the management server 10, servers in operation 20c1, ..., and 20cn (server(s) in operation 20c when they are collectively referred to) and additional servers 20d1, ..., and 20dn (additional server(s) 20d when they are collectively referred to). The server in operation 20c and the additional server 20d correspond to business servers, for example.

The management server 10 includes the control unit 11, and the control unit 11 includes operation management software 110, an OS 120, and a cluster 130. The operation management software 110 includes a network checker 111 and a communication confirmation program pr.

The server in operation 20c includes an OS 2c2 and a duster 2c3 and further includes a business VM (a VM on which a business operates) 2c4.

The management server 10, the server in operation 20c, and the additional server 20d are connected to the aggregation switch 30 by a network cable connected to the management LAN. Furthermore, the management server 10, the server in operation 20c, and the additional server 20d are connected to the aggregation switch 30 by a network cable connected to the business LAN. Moreover, external servers 40 (a DNS server 41, an NTP server 42, and the like) are connected to the management LAN.

[step S41] The operation management software 110 transmits the network checker 111 to the additional servers 20d1, ..., and 20dn via the management LAN.

[step S41a] The additional servers 20d1, ..., and 20dn set the network checker 111, which is network check processing OS, to themselves (the network checker mounted on the additional server 20d is referred to as network checker 111d).

[step S42] The operation management software 110 sets the communication confirmation program pr to the OS 120 in the management server 10.

[step S43] The operation management software 110 transmits the communication confirmation program pr to the servers in operation 20c1, ..., and 20cn via the management LAN.

[step S43a] The servers in operation 20c1, ..., and 20cn set the communication confirmation program pr to the OS 2c2.

[step S44] The operation management software 110 transmits the communication confirmation program pr to the additional servers 20d1 and 20dn via the management LAN.

[step S44a] The additional servers 20d1, ..., and 20dn set the communication confirmation program pr to the network checker 111d.

[step S45] The OS 120 in the management server 10 executes the communication confirmation program pr, performs the communication confirmation between the servers and the network services, and acquires a communication confirmation result.

[step S46] The OS 2c2 in the servers in operation 20c1, ..., and 20cn executes the communication confirmation program pr, performs the communication confirmation between the servers and the network services, and acquires a communication confirmation result.

[step S47] The network checker 111d in the additional servers 20d1, ..., and 20dn executes the communication confirmation program pr, performs the communication confirmation between the servers and the network services, and acquires a communication confirmation result.

Figure 14:
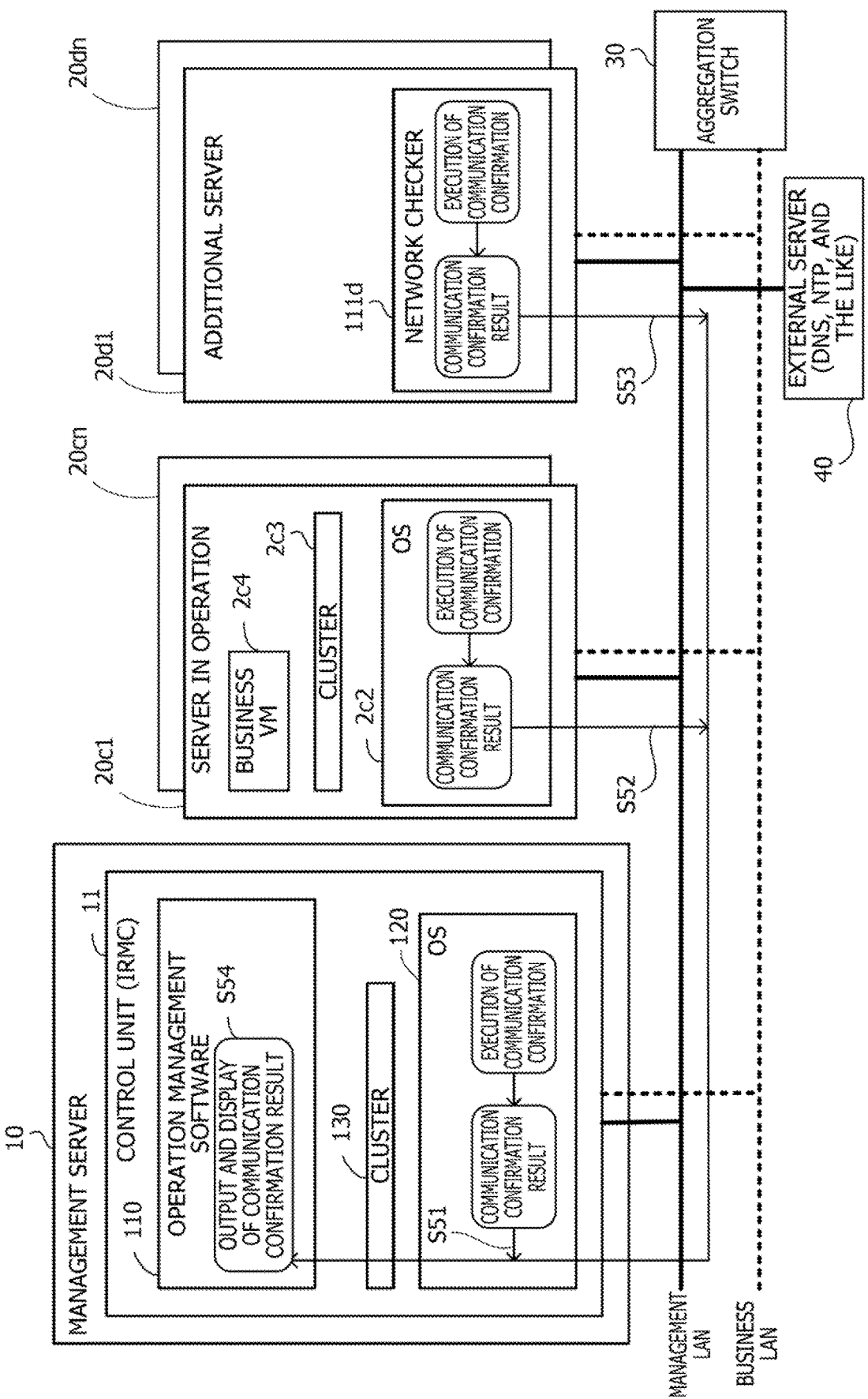
FIG. 14 is a diagram illustrating an example of a flow of outputting a communication confirmation result.

FIG. 14 is a diagram illustrating an example of a flow outputting a communication confirmation result.

[step S51] The OS 120 in the management server 10 transmits the communication confirmation result to the operation management software 110.

[step S52] The OS 2c2 in the servers in operation 20c1, ..., and 20cn transmits the communication confirmation result to the operation management software 110 in the management server 10.

[step S53] The network checker 111d in the additional servers 20d1, ..., and 20dn transmits the communication confirmation result to the operation management software 110 in the management server 10.

[step S54] The operation management software 110 in the management server 10 collates the collected communication confirmation result with the correct communication confirmation state, and outputs and displays a collation result.

Figure 15:
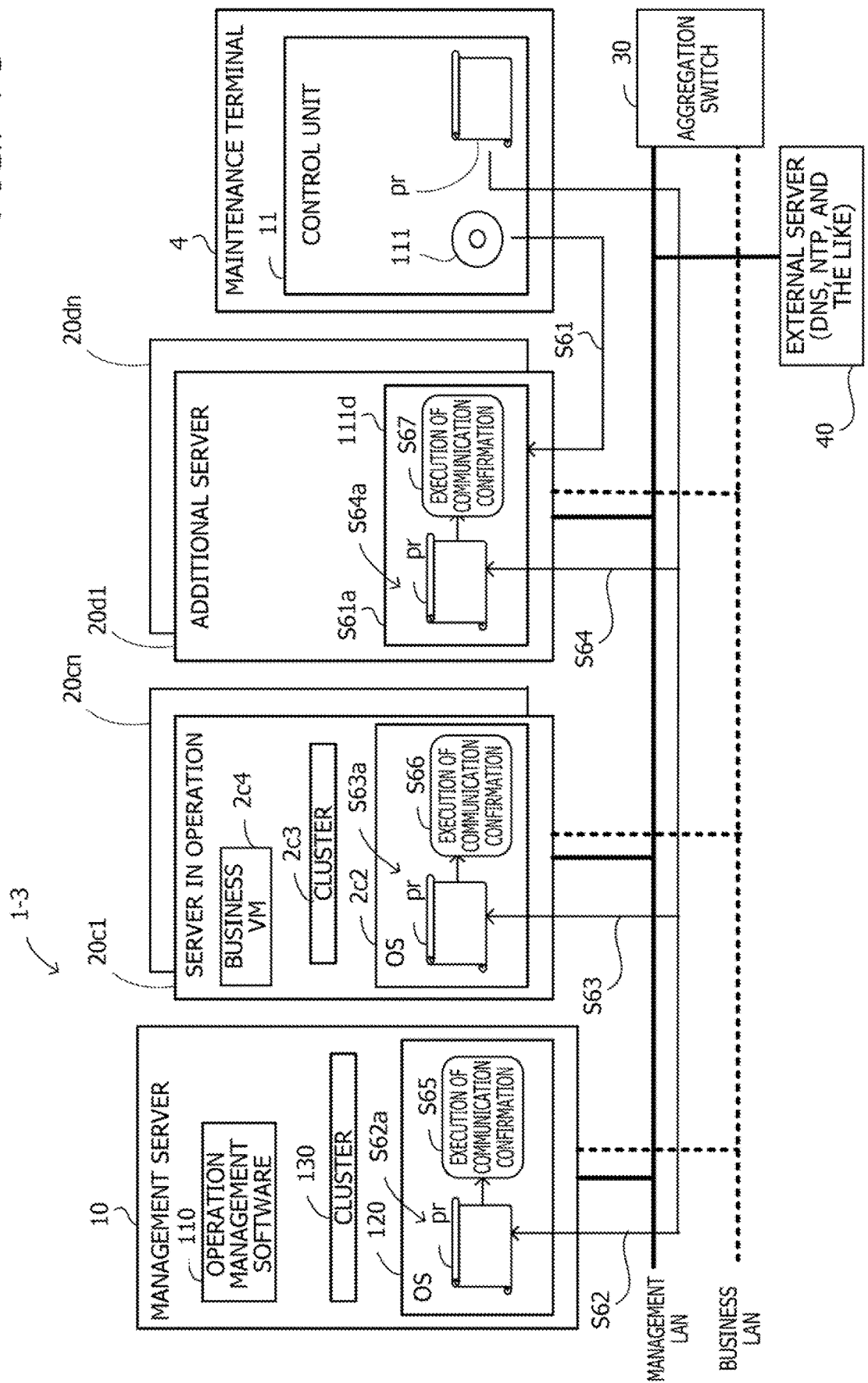
FIG. 15 is a diagram illustrating an example of a flow of mounting and communication confirmation of a network checker.

FIG. 15 is a diagram illustrating an example of a flow of mounting and communication confirmation of a network checker. An information processing system 1-3 includes the management server 10, the servers in operation 20c1, ..., and 20cn, the additional servers 20d1, ..., and 20dn, and a maintenance terminal 4. In the information processing system 1-3, the maintenance terminal 4 is provided with the function of the control unit 11 to have the function of the management server 10.

The management server 10 includes the operation management software 110, the OS 120, and the cluster 130. The server in operation 20c includes the OS 2c2, the cluster 2c3, and a business VM 2c4. The maintenance terminal 4 includes the control unit 11, and the control unit 11 includes the network checker 111 and the communication confirmation program pr.

The management server 10, the server in operation 20c, the additional server 20d, and the maintenance terminal 4 are connected to the aggregation switch 30 by a network cable connected to the management LAN.

[step S61] The control unit 11 in the maintenance terminal 4 transmits the network checker 111 to the additional servers 20d1, ..., and 20dn via the management LAN.

[step S61a] The additional servers 20d1, ..., and 20dn set the network checker 111, which is a network check processing OS, to themselves.

[step S62] The maintenance terminal 4 transmits the communication confirmation program pr to the management server 10 via the management LAN.

[step S62a] The management server 10 sets the communication confirmation program pr to the OS 120.

[step S63] The maintenance terminal 4 transmits the communication confirmation program pr to the servers in operation 20c1, ..., and 20cn via the management LAN.

[step S63a] The servers in operation 20c1, ..., and 20cn set the communication confirmation program pr to the OS 2c2.

[step S64] The maintenance terminal 4 transmits the communication confirmation program pr to the additional servers 20d1, ..., and 20dn via the management LAN.

[step S64a] The additional servers 20d1, ..., and 20dn set the communication confirmation program pr to the network checker 111d.

[step S65] The OS 120 in the management server 10 executes the communication confirmation program pr, performs the communication confirmation between the servers and the network services, and acquires a communication confirmation result.

[step S66] The OS 2c2 in the servers in operation 20c1, ..., and 20cn executes the communication confirmation program pr, performs the communication confirmation between the servers and the network services, and acquires a communication confirmation result.

[step S67] The network checker 111d in the additional servers 20d1, . . . , and 20dn executes the communication confirmation program pr, performs the communication confirmation between the servers and the network services, and acquires a communication confirmation result.

<Items Checked by Network Checker>

Figure 16:
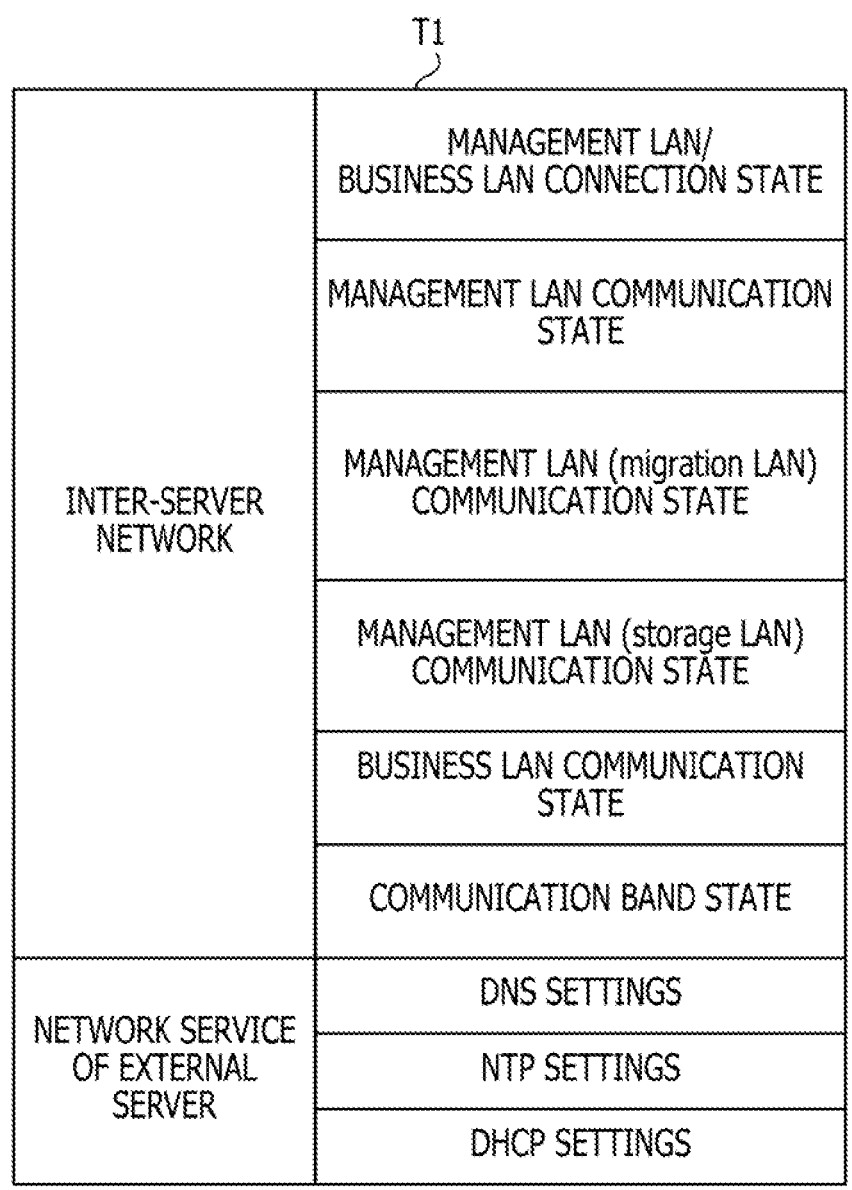
FIG. 16 is a diagram illustrating an example of items checked by the network checker.

FIG. 16 is a diagram illustrating an example of items checked by the network checker. Table T1 illustrates items to be checked by the network checker, and includes items of communication confirmation regarding inter-server networks and communication confirmation regarding network services of the external servers.

Examples of the communication confirmation regarding inter-server networks include a management LAN/business LAN connection state, a management LAN communication state, a management LAN (migration LAN) communication state, a management LAN (storage LAN) communication state, a business LAN communication state, and a communication band state. There are DNS settings, NTP settings, and DHCP settings as the communication confirmation regarding the network services of the external servers. Specific content of the check processing will be described below.

<Table Illustrating Communication State>

FIG. 17 is a diagram illustrating an example of a communication state between servers. In a case of performing network check processing, the correct communication state as the system is managed in advance in table T2 as illustrated in FIG. 17, and an execution result by the communication confirmation program is collated with the table T2 to determine the appropriateness.

In the example of the table T2, the communication state (correct communication state) assumable between the server sv1 and the server sv2 is illustrated. The server sv1 has slots st1 and st2, and the slot st1 includes ports P0 and P1 and the slot st2 includes ports P0 and P1. Similarly, the server sv2 has slots st1 and st2, and the slot st1 includes ports P0 and P1 and the slot st2 includes ports P0 and P1.

Furthermore, the port P0 includes ports p0, . . . , and p4 as VLAN ports, and the port P1 includes ports p0, . . . , and p4 as VLAN ports. Port p0 is a management LAN port, and ports p1 and p2 are business LAN ports. The port p3 is a vMotion LAN port, and the port p4 is a storage LAN port.

In such a table matrix, for example, the server sv1 intercommunicates with the port p0 of the port P0 of the slot st1 of the server sv2. Therefore, the network checker checks whether this intercommunication is possible.

Furthermore, the server sv1 does not intercommunicate with the port p1 of the port P0 of the slot st1 of the server sv2. Therefore, the network checker checks whether this intercommunication is actually not possible. For example, in a case where the network checker determines that intercommunication is possible, there is an error in connection or the like, and incorrect connection is determined.

<Allocation of Temporary IP Address>

FIG. 18 is a diagram illustrating an example of allocation of a temporary IP address to an unconstructed server. In the case where the system is unconstructed, the control unit 11 allocates a temporary IP address to the server and performs a network check to perform the communication confirmation.

In this case, to prevent duplication in each server, for example, the same network address is allocated to LANs having the same slot number and the same port number, and whether the LANs existing in the same network can communicate with each other is confirmed.

In table T3, for example, the IP address (192.168.8.1) is allocated to the VLAN (mgmt) of the port P0 of the slot st1 of the server sv1, and the IP address (192.168.8.2) is allocated to the VLAN (mgmt) of the port P0 of the slot st1 of the server sv2, and it is confirmed that communication is possible with such IP addresses. Furthermore, it is also confirmed that communication is not possible except between the IP address (192.168.8.1) and the IP address (192.168.8.2).

Note that, as a system for allocating IP addresses, in this example, four VLANs are allocated to respective ports, and one subnet is allocated to one VLAN of one host (mask length=24).

Figure 19:
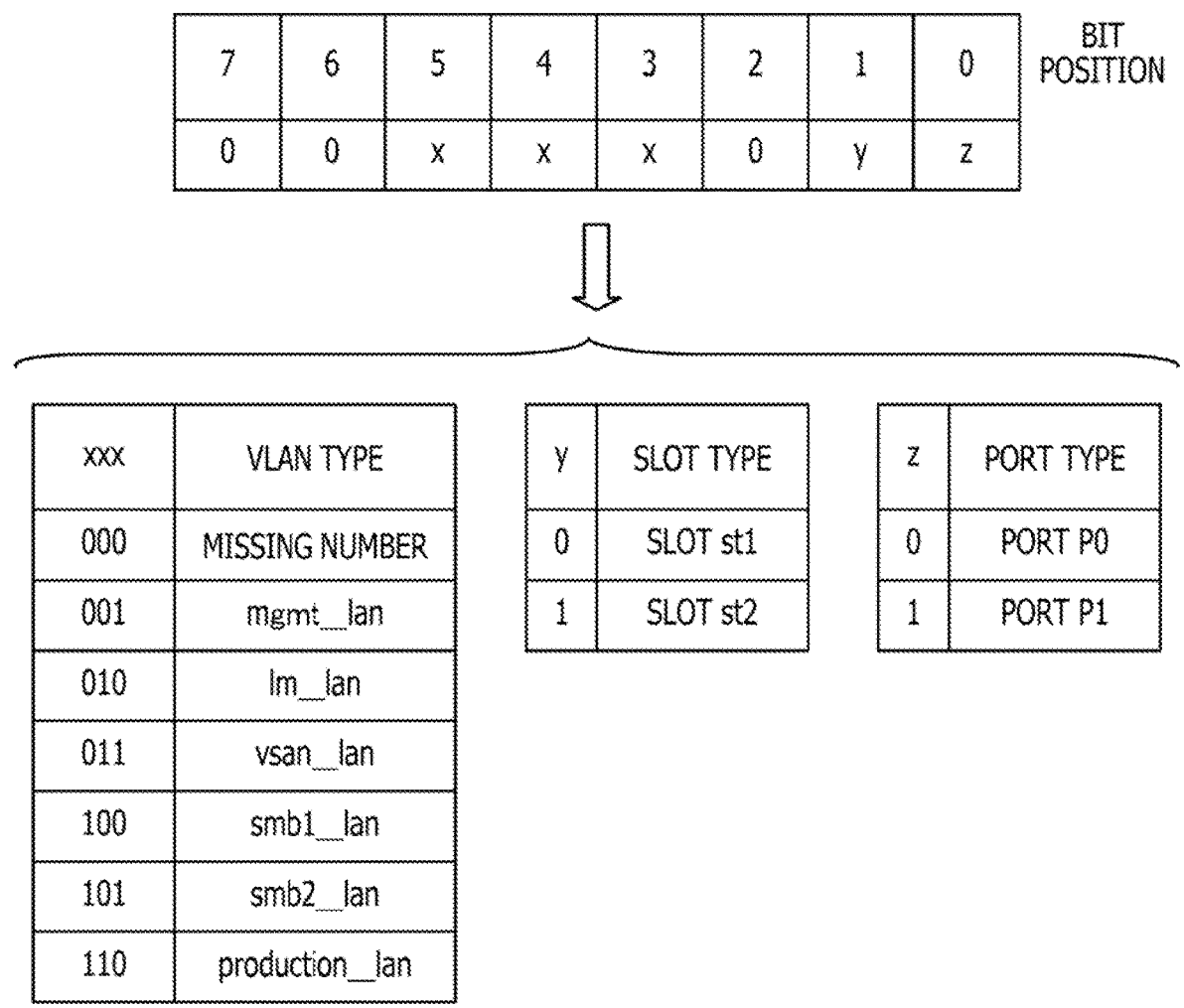
FIG. 19 is a diagram illustrating an example of allocation of a third octet of the temporary IP address.

FIG. 19 is a diagram illustrating an example of allocation of third octet of the temporary IP address. It is assumed that bit 0=z, bit 1=y, bit 2=0, bit 3=x, bit 4=x, bit 5=x, bit 6=0, and bit 7=0.

It is assumed that z is a port type, and z=0 is the port P0 and z=1 is the port P1. It is assumed that y is a slot type, and y=0 is the slot st1 and y=1 is the slot st2.

Furthermore, it is assumed that xxx is a VLAN type. For example, it is assumed that xxx=000 is a missing number, xxx=001 is mgmt LAN (management LAN), xxx=010 is lm LAN, xxx=011 is a vsan LAN, xxx=100 is an smb1 LAN, xxx=101 is an smb2 LAN, and xxx=110 is a production LAN (business LAN).

For example, in the case of the slot st1, port P0, and mgmt LAN, 00001000=8 is allocated. In the case of the slot st1, port P0, and production LAN, 00110000=48 is allocated. In the case of the slot st2, port P1, and lm LAN, 00010011=19 is allocated.

Note that the allocation of the fourth octet of the temporary IP address is caused to match the number of the server. For example, when the server sv1 is the first device, the fourth octet of the temporary IP address is set to 1.

<Sequence of Network Check Processing>

Figure 20:
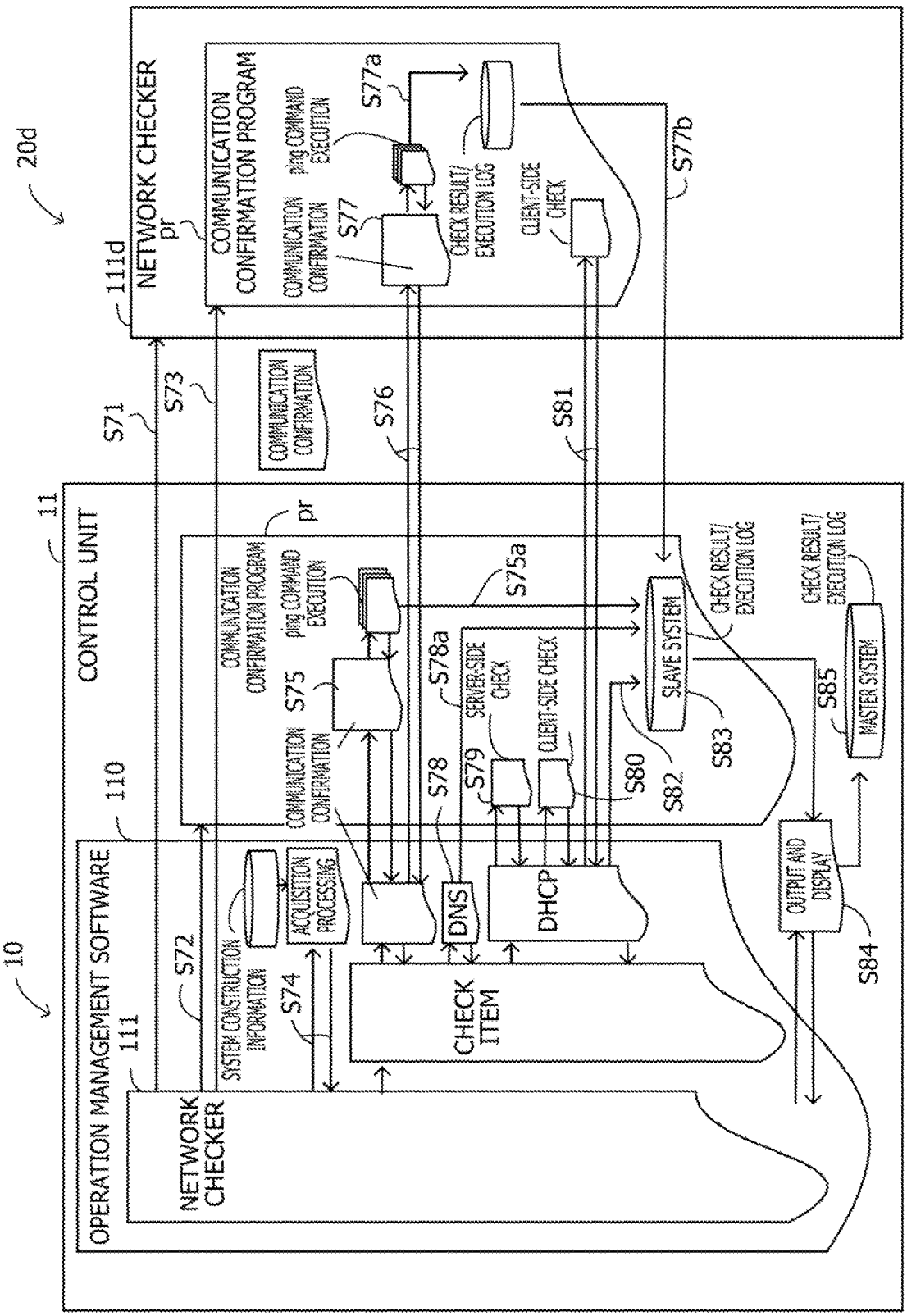
FIG. 20 is a diagram illustrating an example of a sequence of the network check processing.

FIG. 20 is a diagram illustrating an example of a sequence of the network check processing. An example of a sequence between the management server 10 and the additional server 20d is illustrated. Furthermore, the network service check for the DNS server and the DHCP server is performed as the external servers.

[step S71] The management server 10 includes the control unit 11, and the operation management software 110 in the control unit 11 transmits the network checker 111d (network check processing OS) to the additional server 20d.

[step S72] The network checker 111 in the management server 10 activates the communication confirmation program pr.

[step S73] The operation management software 110 transmits the communication confirmation program pr to the network checker 111d in the additional server 20d.

[step S74] The network checker 111 requests and acquires the system construction information from the storage unit 12.

[step S75] The network checker 111 executes the communication confirmation by a ping command using the communication confirmation program pr to perform the communication confirmation for the management server 10 on the basis of the check items in the table T1.

[step S75a] The network checker 111 stores the communication confirmation result.

[step S76] The network checker 111 gives an execution instruction of the communication confirmation to the network checker 111*d* of the additional server 20*d* (gives the execution instruction and obtains an ACK).

[step S77] The network checker 111*d* executes the communication confirmation by a ping command using the communication confirmation program pr to perform the communication confirmation for the additional server 20*d* on the basis of the check items in the table T1.

[step S77*a*] The network checker 111*d* stores the communication confirmation result.

[step S77*b*] The network checker 111*d* transmits the communication confirmation result to the management server 10.

[step S78] The network checker 111 performs a network service check (name resolution check) for the DNS server.

[step S78*a*] The network checker 111 stores a network service check result for the DNS server in the storage unit 12.

[step S79] The network checker 111 performs a network service check regarding the operation of the DHCP server side (check of the operation of allocating the IP address to the DHCP client side).

[step S80] The network checker 111 performs a network service check regarding the operation of the DHCP client side (check of the operation of allocating the IP address from the DHCP server side).

[step S81] The network checker 111 causes the network checker 111*d* of the additional server 20*d* to execute the network service check regarding the operation of the DHCP client side (gives the execution instruction and obtain an ACK).

[step S82] The network checker 111 stores a network service check result for the DHCP server in the storage unit 12.

[step S83] The storage unit 12 stores the communication confirmation result and the communication confirmation execution log of the management server 10, the additional server 20*d*, and the server in operation as slave system information.

[step S84] The control unit 11 sums up the information stored in step S83, and outputs and displays a summed result on the GUI.

[step S85] The storage unit 12 stores the summed result and the output display result as master system information.

<Operation Based on Check Items>

Figure 21:
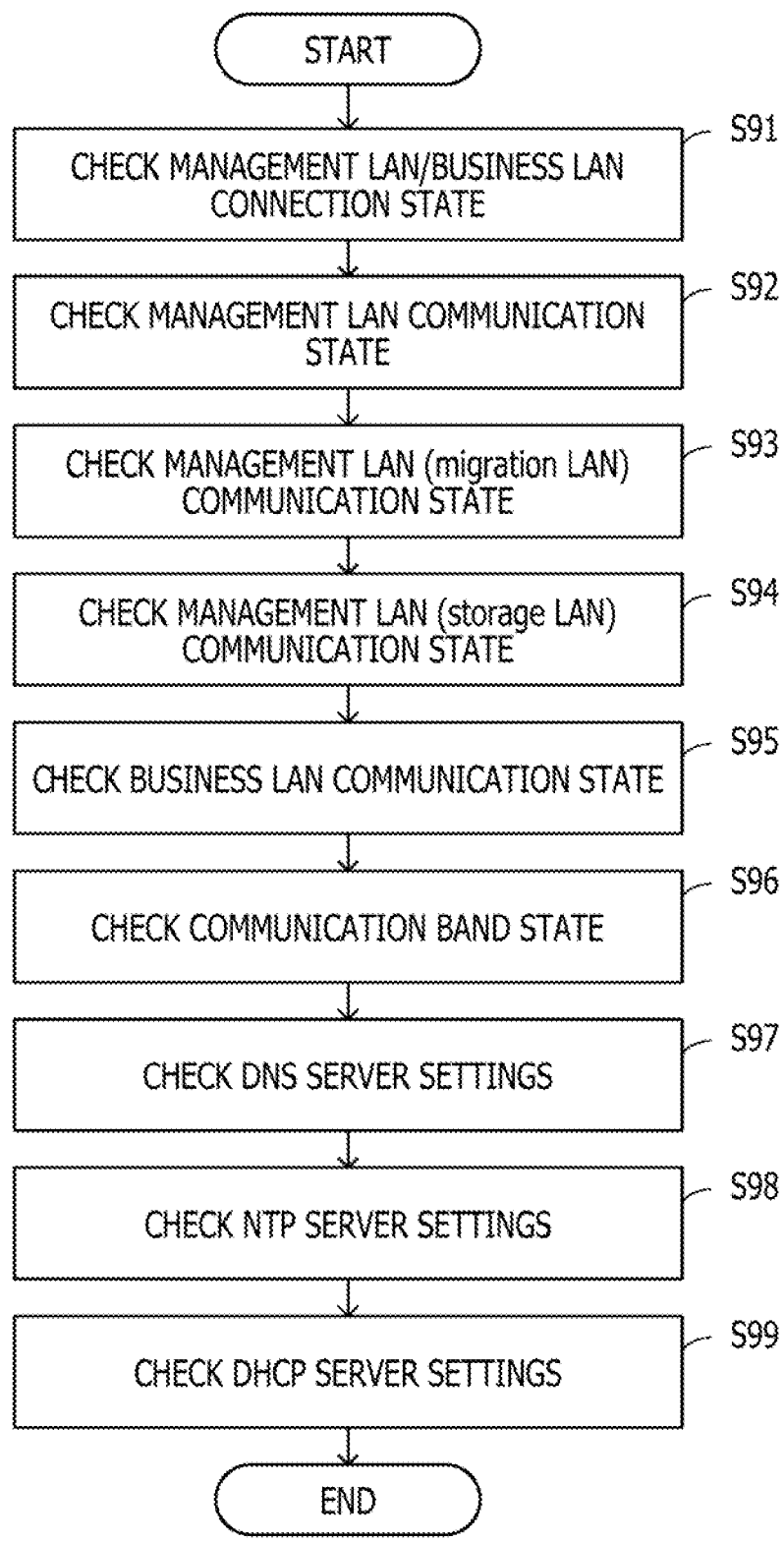
FIG. 21 is a flowchart illustrating an example of an operation of the network check processing.

FIG. 21 is a flowchart illustrating an example of the operation of the network check processing. FIG. 21 illustrates an operation flow in the case of performing the communication confirmation for each of the check items illustrated in the table T1 in FIG. 16. Note that the communication confirmation for the inter-server networks is performed in step S91 to step S96, and confirmation of the network services for the external servers is performed in step S97 to step S99.

[step S91] The network checker 111 checks the management LAN/business LAN connection state. The management LAN/business LAN connection state is network connection of each server to the NICs of the management LAN/business LAN.

The network checker 111 executes a command on each server (ethertool) to check the connection state. Thereby, detection of a failure or the like due to non-connection becomes possible before the network construction.

[step S92] The network checker 111 checks the management LAN communication state. The management LAN communication state is a communication state in the management LAN between respective servers. The network checker executes a communication command between ports of the respective servers (ping) to check the management LAN communication state. Thereby, detection of a failure or the like due to one-side connection of the management LAN becomes possible before the network construction.

[step S93] The network checker 111 checks the management LAN (migration LAN) communication state. The management LAN (migration LAN) communication state is a communication state in the migration LAN of VLANs as the management LAN between the respective servers, for example.

The network checker 111 executes a communication command between the ports of the respective servers (ping) to check the communication state in the migration LAN. Thereby, detection of a failure or the like due to non-VLAN settings for migration LAN to the aggregation switch 30 becomes possible before the network construction.

[step S94] The network checker 111 checks the management LAN (storage LAN) communication state. The management LAN (storage LAN) communication state is a communication state in the storage LAN of VLANs as the management LAN between the respective servers, for example.

The network checker 111 executes a communication command between the ports of the respective servers (ping) to check the communication state in the storage LAN. Thereby, detection of a failure or the like due to non-VLAN settings for storage LAN to the aggregation switch 30 becomes possible before the network construction.

[step S95] The network checker 111 checks the business LAN communication state. The business LAN communication status is a communication state in the business LAN between the respective servers. The network checker 111 executes a communication command between the ports of the respective servers (ping) to check the business LAN communication state. Thereby, detection of a failure or the like due to non-VLAN settings for business LAN to the aggregation switch 30 becomes possible before the network construction.

[step S96] The network checker 111 checks the communication band state. The communication band state is a state of the communication band of the management LAN/business LAN of each server. The network checker 111 executes a command on each server (ethertool) to check the communication band of the management LAN/business LAN. Thereby, detection of a failure or the like due to the communication band having been not secured becomes possible before the network construction.

[step S97] The network checker 111 checks the settings of the DNS server 41. The DNS settings relate to the settings of the DNS server 41. The network checker 111 executes a command on the management server (dig) to check the settings of the DNS server 41. Thereby, detection of a failure or the like due to the DNS server 41 having been not normally set becomes possible before the network construction.

[step S98] The network checker 111 checks the settings of the NTP server 42. The NTP settings relate to the settings of the NTP server 42. The network checker 111 executes a command on the management server (ntpdate) to check the settings of the NTP server 42. Thereby, detection of a failure or the like due to the NTP server 42 having been not normally set becomes possible before the network construction.

[step S99] The network checker 111 checks the settings of the DHCP server 43. The DHCP settings relate to the settings of the DHCP server 43. The network checker 111 performs the DHCP server operation on the management server and the DHCP client operation on a server (a server corresponding to a slave) other than the management server, and checks the settings of the DHCP server 43. Thereby, detection of a failure or the like due to the DHCP server 43 having been not normally set becomes possible before the network construction.

<Result Display of Network Check Processing>

Figure 22:
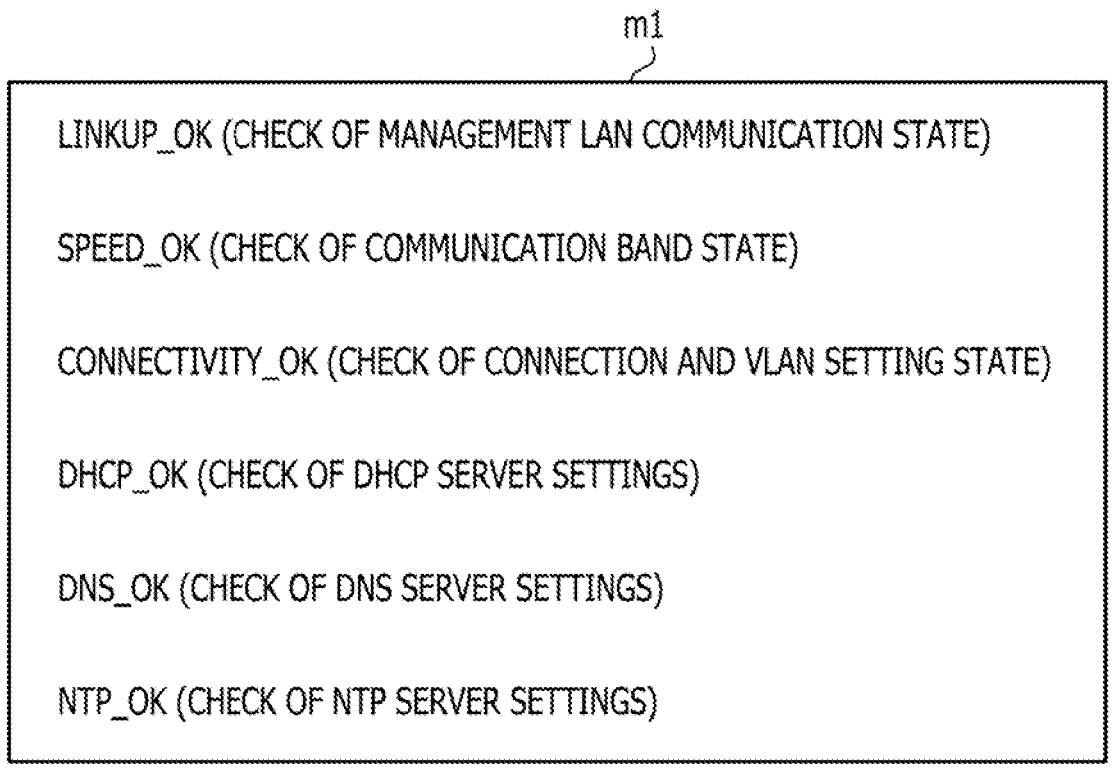
FIG. 22 is a diagram illustrating an example of network communication confirmation result display.

FIG. 22 is a diagram illustrating an example of the network communication confirmation result display. In a case where an error is not detected at the time of network check, a communication confirmation result screen m1 is displayed by the GUI of the operation management software 110.

On the communication confirmation result screen m1, LINKUP_OK (check of the management LAN communication state), SPEED_OK (check of the communication band state), CONNECTIVITY_OK (check of the connection and the VLAN setting state), DHCP_OK (check of the settings of DHCP server 43), DNS_OK (check of the settings of the DNS server 41), and NTP_OK (check of the settings of NTP server 42) are displayed. Note that "OK" indicates that the communication confirmation has been normally performed. For example, LINKUP_OK indicates that check of the management LAN communication state has been normally performed.

(In the case where connection between the management LAN and the business LAN is opposite)

FIG. 23 is a diagram illustrating an example of the network communication confirmation result display. A communication confirmation result screen m2 illustrates an example of the display result at the time of incorrect connection. In the case where the connection between the management LAN and the business LAN is opposite on the server side, the result illustrated in FIG. 23 is displayed by the GUI of the operation management software.

Table T11 has items of the server (server number), slot, port (port number), management LAN, vMotion LAN, vSAN LAN, and business LAN. In the ports P0 and P1 of the slot st0 of the server sv1, (management LAN, vMotion LAN, vSAN LAN, and business LAN)=(Fail, Fail, Fail, Fail). The connection of the port P0 and the port P1 is opposite. When such a screen is displayed, the operator can easily recognize an incorrect setting portion.

(In the case where storage LAN tag settings are incorrect in the VLAN settings)

FIG. 24 is a diagram illustrating an example of network communication confirmation result display. A communication confirmation result screen m3 illustrates an example of the display result in the case where the storage LAN tag settings are incorrect in the management LAN VLAN settings. Table T12 illustrates a display of when the vSAN LAN (Storage-dedicated VLAN Tag) is not set or the set value is different in the port of the network switch on the connection destination of the network cable from the slot st0 side of the server sv1. When such a screen is displayed, the operator can easily recognize an incorrect setting portion.

(In the Case where a Trouble Occurs in the Management LAN Cable Connection)

FIG. 25 is a diagram illustrating an example of the network communication confirmation result display. A communication confirmation result screen m4 illustrates an example of a display result when a trouble occurs in the management LAN cable connection. Tables T13a and T13b illustrate displays of when the cable is not connected from the slot st0 side of the server sv1 to the network switch on the connection destination of the network cable. When such a screen is displayed, the operator can easily recognize an incorrect setting portion.

(In the Case where there is No Sufficient Band in Whole or Part of the Management LAN/Business LAN)

FIG. 26 is a diagram illustrating an example of the network communication confirmation result display. A communication confirmation result screen m5 illustrates an example of the display result when there is no sufficient band in the whole or part of the management LAN/business LAN. Table T14 illustrates a display of when the network bandwidth of the port P0 of the slot st0 of the server sv1 is insufficient. When such a screen is displayed, the operator can easily recognize an incorrect setting portion.

(In the Case where a Service on the Network Cannot be Used Due to Incorrect VLAN Settings)

FIG. 27 is a diagram illustrating an example of the network communication confirmation result display. A communication confirmation result screen m6 illustrates an example of the display result when a service on the network cannot be used due to incorrect VLAN settings. Tables T15a, T15b, and T15c display that the services on the network by the DHCP server 43, the DNS server 41, and the NTP server 42 cannot be used for all the servers for which the virtualization infrastructure is to be constructed. When such a screen is displayed, the operator can easily recognize an incorrect setting portion.

The above-described processing functions of the information processing system, the information processing device, and the server (management server) of the embodiments can be implemented by a computer. In this case, a program in which the processing content of the functions of the information processing system, the information processing device, and the server is described is provided. The program is executed on the computer, whereby the above processing functions are implemented on the computer.

The program in which the processing content is described can be recorded on a computer-readable recording medium. Examples of the computer-readable recording medium include a magnetic storage unit, an optical disk, a magneto-optical recording medium, and a semiconductor memory. Examples of the magnetic storage unit include a hard disk drive (HDD), a flexible disk (FD), and a magnetic tape. An example of the optical disk includes a CD-ROM/RW. An example of the magneto-optical recording medium includes a magneto-optical (MO) disk.

In a case of distributing the program, for example, portable recording media such as CD-ROMs in which the program is recorded are sold. Alternatively, it is possible to store the program in a storage unit of a server computer and transfer the program from the server computer to another computer via a network.

The computer which executes the program stores, for example, the program recorded in the portable reading medium or the program transferred from the server computer in a storage unit of the computer. Then, the computer reads the program from the storage unit of the computer and executes processing according to the program. Note that, the computer can also read the program directly from the portable recording medium and execute processing according to the program.

Furthermore, the computer can also execute processing according to the received program each time the program is transferred from the server computer connected via the network. Furthermore, at least part of the above processing functions can be implemented by an electronic circuit such as a DSP, an ASIC, or a PLD.

The embodiments are illustrated as described above. However, the configuration of each portion described in the embodiments may be replaced with another having the similar function. Furthermore, other arbitrary components and steps may be added. Moreover, any two or more configurations (features) of the above-described embodiments may be combined.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An information processing device, comprising:
   a memory; and
   a processor coupled to the memory and configured to:
   store, in the memory, a confirmation program for performing communication confirmation of a network,
   transmit the confirmation program to a server in the network,
   collect, before the network is constructed, from the server, an execution result of the communication confirmation obtained by causing the server to execute the confirmation program for the communication confirmation, and
   perform correctness determination of the execution result.

2. The information processing device according to claim 1, wherein the processor is configured to:
   store a table illustrating a communication state for correctness determination in advance, and
   perform the correctness determination by collating the collected execution result with the table.

3. The information processing device according to claim 1, wherein the processor is configured to perform the communication confirmation via the temporary address by allocating a temporary address not overlapping with another server to an additional new server.

4. The information processing device according to claim 1, wherein the processor is configured to:
   transmit an operating system (OS) for executing the confirmation program to an additional new server,
   transmit the confirmation program to the OS, and
   cause the new server to execute the communication confirmation.

5. The information processing device according to claim 1, wherein the processor is configured to:
   be connected to a management network used for system management and to a business network used when operating a business via a switch, and
   execute confirmation of a first communication state between the server and the management network and a second communication state between the server and the business network using the confirmation program.

6. The information processing device according to claim 5, wherein the processor is configured to
   execute confirmation of a connection state between the server and the management network, a state in which the server is one-side connected with the management network, and a communication band state between the server and the management network, as the first communication state.

7. The information processing device according to claim 5, wherein the processor is configured to when the management network includes a migration network for migrating a virtual machine in the server and a storage network for operating a storage in the server, execute confirmation of presence or absence of a setting for the migration network for the switch and presence or absence of a setting for the storage network for the switch, as the first communication state.

8. The information processing device according to claim 5, wherein the processor is configured to execute confirmation of a connection state between the server and the business network, presence or absence of a setting for the business network for the switch, and a communication band state between the server and the business network, as the second communication state.

9. The information processing device according to claim 1, wherein the processor is configured to execute confirmation of an unusable state of a network service using the confirmation program when an external server for performing the network service is connected to the network.

10. The information processing device according to claim 9, wherein
    the external server includes at least one of a domain name system (DNS) server, a network time protocol (NTP) server, or a dynamic host configuration protocol (DHCP) server,
    wherein the processor is configured to:
    execute confirmation of a state whether name resolution execution is executed by the DNS server as the network service in a case where the DNS server is connected to the network,
    execute confirmation of a state whether a time synchronization is executed by the NTP server as the network service in a case where the NTP server is connected to the network, and
    execute confirmation of a state whether an internet protocol (IP) address allocation is executed by the DHCP server as the network service in a case where the DHCP server is connected to the network.

11. The information processing device according to claim 1, wherein the processor is configured to collect the execution result of the communication confirmation transmitted from the server by causing the server to execute the confirmation program by transmitting the confirmation program.

12. The information processing device according to claim 2, wherein the execution result of the communication confirmation is obtained by causing the server to execute the communication confirmation program based on table includes items of communication confirmation regarding the network.

13. An information processing system comprising:
    a server that includes a first memory and a first processor coupled to the first memory; and
    an information processing device that includes a second memory and a second processor coupled to the second memory, wherein
    the first processor is configured to specify an execution result of communication confirmation of a network by using a confirmation program for perform the communication confirmation, and the second processor is configured to:

collect, before the network is constructed, from the server, the execution result obtained by causing the server to execute the confirmation program for the communication confirmation, and perform correctness determination of the execution result.

14. A network communication confirmation method executed by a computer, the network communication confirmation method comprising:

storing, in a memory, a confirmation program for performing communication confirmation of a network, transmitting the confirmation program to a server in the network, collecting, before the network is constructed, an execution result of the communication confirmation obtained by causing the server to execute the confirmation program for the communication confirmation, and performing correctness determination of the execution result.

* * * * *